(12) United States Patent
Ohlsson et al.

(10) Patent No.: US 6,907,245 B2
(45) Date of Patent: Jun. 14, 2005

(54) DYNAMIC OFFSET THRESHOLD FOR DIVERSITY HANDOVER IN TELECOMMUNICATIONS SYSTEM

(75) Inventors: Jonas Ohlsson, Luleå (SE); Staffan Johansson, Luleå (SE); Daniel Jannok, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 612 days.

(21) Appl. No.: 09/931,580

(22) Filed: Aug. 17, 2001

(65) Prior Publication Data

US 2002/0068571 A1 Jun. 6, 2002

Related U.S. Application Data

(60) Provisional application No. 60/250,476, filed on Dec. 4, 2000, and provisional application No. 60/250,473, filed on Dec. 4, 2000.

(51) Int. Cl.[7] .................................................. H04Q 7/20
(52) U.S. Cl. ..................... 455/442; 455/436; 455/437; 455/438; 455/439; 370/331; 370/332; 370/333
(58) Field of Search ................................ 455/442, 436, 455/437, 438, 439, 522; 370/331, 332, 333

(56) References Cited

U.S. PATENT DOCUMENTS

| | | |
|---|---|---|
| 5,263,026 A | 11/1993 | Parr et al. |
| 5,267,261 A | 11/1993 | Blakeney, II et al. |
| 5,406,593 A | 4/1995 | Chennakeshu et al. |
| 5,408,517 A | 4/1995 | Nyhart et al. |
| 5,448,600 A | 9/1995 | Lucas |
| 5,490,165 A | 2/1996 | Blakeney, II et al. |
| 5,530,912 A | 6/1996 | Agrawal et al. |

(Continued)

FOREIGN PATENT DOCUMENTS

| | | |
|---|---|---|
| EP | 054195 A | 11/1999 |
| EP | 954194 A | 11/1999 |

(Continued)

OTHER PUBLICATIONS

3rd Generation Partnership Project; Technical Specification Group Radio Access Network; Synchronization in UTRAN Stage 2 (Release 1999), 3GPP TS 25.402 V3.3.0 (Sep. 2000).

(Continued)

*Primary Examiner*—William Trost
*Assistant Examiner*—Danh Le
(74) *Attorney, Agent, or Firm*—Nixon & Vanderhye, P.C.

(57) ABSTRACT

A telecommunications system has a source base station ($BS_S$) and a destination base station ($BS_D$), and a handover unit (100) having a dynamic offset threshold determination unit (102) which establishes a dynamic offset threshold for starting soft handover. When the dynamic offset threshold for soft handover is exceeded, a preliminary portion of a handover sequence is initiated at the destination base station. The preliminary portion of the handover sequence is initiated so that a time-critical handover sequence activity (such as L1 uplink synchronization) is well underway, if not completed, by the time the soft handover is actually needed. The dynamic offset threshold for starting handover is based on a probability that the mobile station will engage in the handover. The probability is a statistical probability that handover will actually occur based on handover history of other mobile stations previously and similarly traveling and of the same signal strength. Another portion of the soft handover sequence (e.g., a remaining portion of the soft handover sequence) is initiated when the signal strength from the destination base station as received at the specified mobile station has a predetermined relationship to a fixed offset threshold.

30 Claims, 16 Drawing Sheets

U.S. PATENT DOCUMENTS

| | | | |
|---|---|---|---|
| 5,533,063 A | | 7/1996 | Mitra et al. |
| 5,577,022 A | | 11/1996 | Padovani et al. |
| 5,644,591 A | | 7/1997 | Sutton |
| 5,649,000 A | | 7/1997 | Lee et al. |
| 5,652,748 A | | 7/1997 | Jolma et al. |
| 5,654,979 A | | 8/1997 | Levin et al. |
| 5,703,873 A | | 12/1997 | Ojanpera et al. |
| 5,726,982 A | | 3/1998 | Witter |
| 5,790,589 A | | 8/1998 | Hutchison, IV et al. |
| 5,818,866 A | | 10/1998 | Wilk |
| 5,818,876 A | | 10/1998 | Love |
| 5,828,659 A | | 10/1998 | Teder et al. |
| 5,881,058 A | | 3/1999 | Chen |
| 5,913,169 A | | 6/1999 | Vaara |
| 6,052,598 A | | 4/2000 | Rudrapatna et al. |
| 6,073,021 A | * | 6/2000 | Kumar et al. ............... 455/442 |
| 6,104,712 A | | 8/2000 | Robert et al. |
| 6,108,538 A | * | 8/2000 | Blasiak et al. .............. 455/428 |
| 6,167,035 A | * | 12/2000 | Veeravalli et al. .......... 370/331 |
| 6,349,508 B1 | * | 2/2002 | Ju et al. ..................... 455/439 |
| 6,507,740 B2 | * | 1/2003 | Shi ............................ 455/437 |
| 2002/0068566 A1 | * | 6/2002 | Ohlsson et al. ............. 455/436 |
| 2003/0142647 A1 | * | 7/2003 | Agrawal et al. ............ 370/331 |

FOREIGN PATENT DOCUMENTS

| | | |
|---|---|---|
| WO | 9610873 | 4/1996 |
| WO | 96/19056 A | 6/1996 |
| WO | 96/24988 A | 8/1996 |
| WO | 97/02714 A | 1/1997 |
| WO | 98/52378 | 11/1998 |
| WO | 99/57819 | 11/1999 |
| WO | 99/63677 A | 12/1999 |
| WO | 99/63713 | 12/1999 |

OTHER PUBLICATIONS

U.S. Appl. No. 09/452,100, filed Dec. 4, 1999, entitled "Synchronization of Diversity Handover Destination Base Station".

U.S. Appl. No. 09/931,280, Entitled "Preliminary Performance of Handover Functions in Telecommunications System", filed Aug. 17, 2001.

*Radio Resource Management Strategies*, 3G TR 25.922, Ver. 3.5.0, Sep. 1999, generated by the Third Generation Partnership Project, Technical Specification Group RAN, Working Group 2 (WG2).

$3^{rd}$ Generation Partnership Project; Technical Specification Group Radio Access Network; RRC Protocol Specification (Release 1999), 3GPP TS 25.331 V3.6.0 (Mar. 2001).

U.S. Appl. No. 09/070,778, entitled "Search Window Delay Tracking In Code Division Multiple Access Communication System" filed May 1, 1998.

International Preliminary Examination Report mailed Oct. 24, 2002 in corresponding PCT application No. PCT/SE01/02682.

* cited by examiner

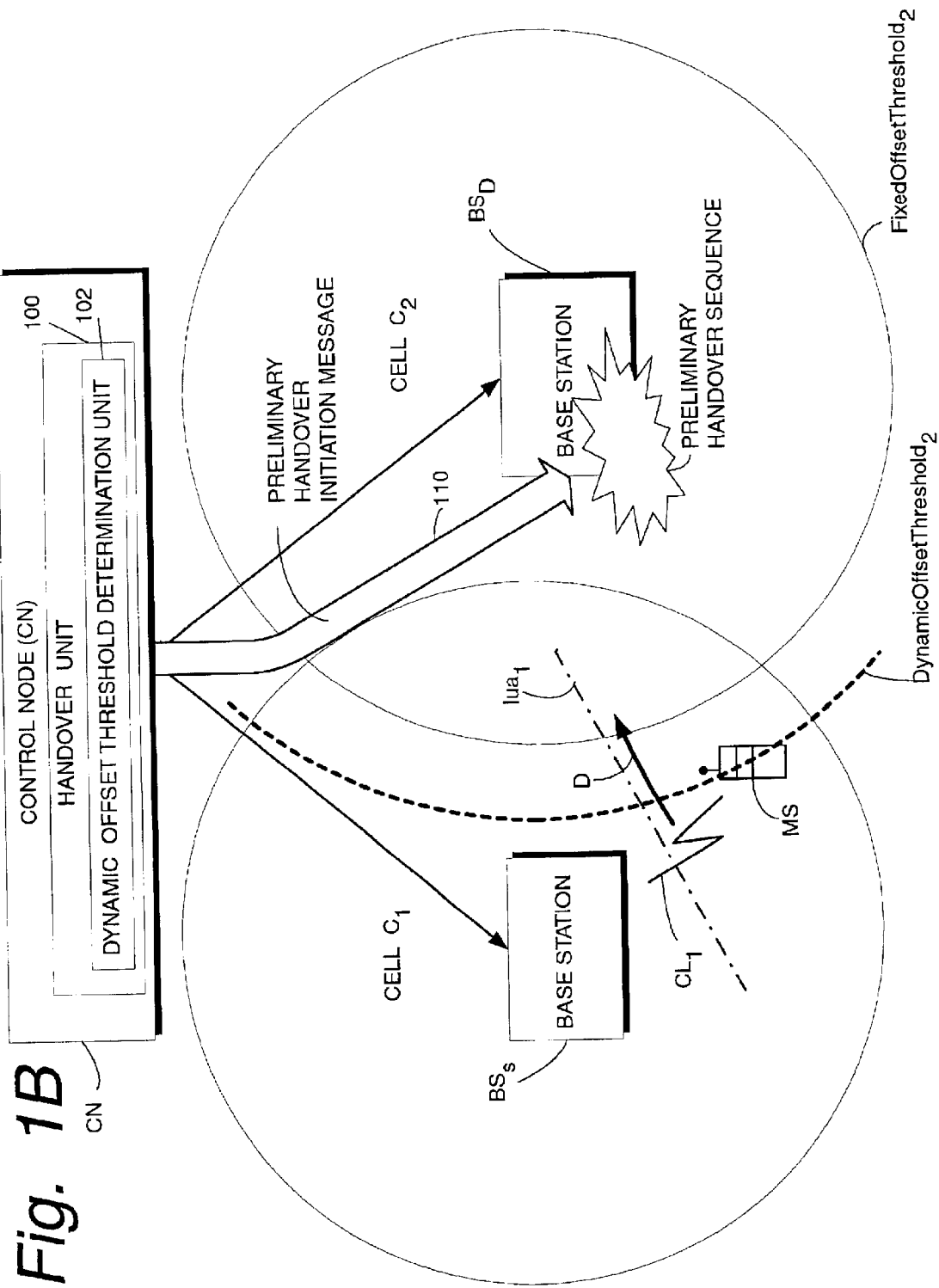

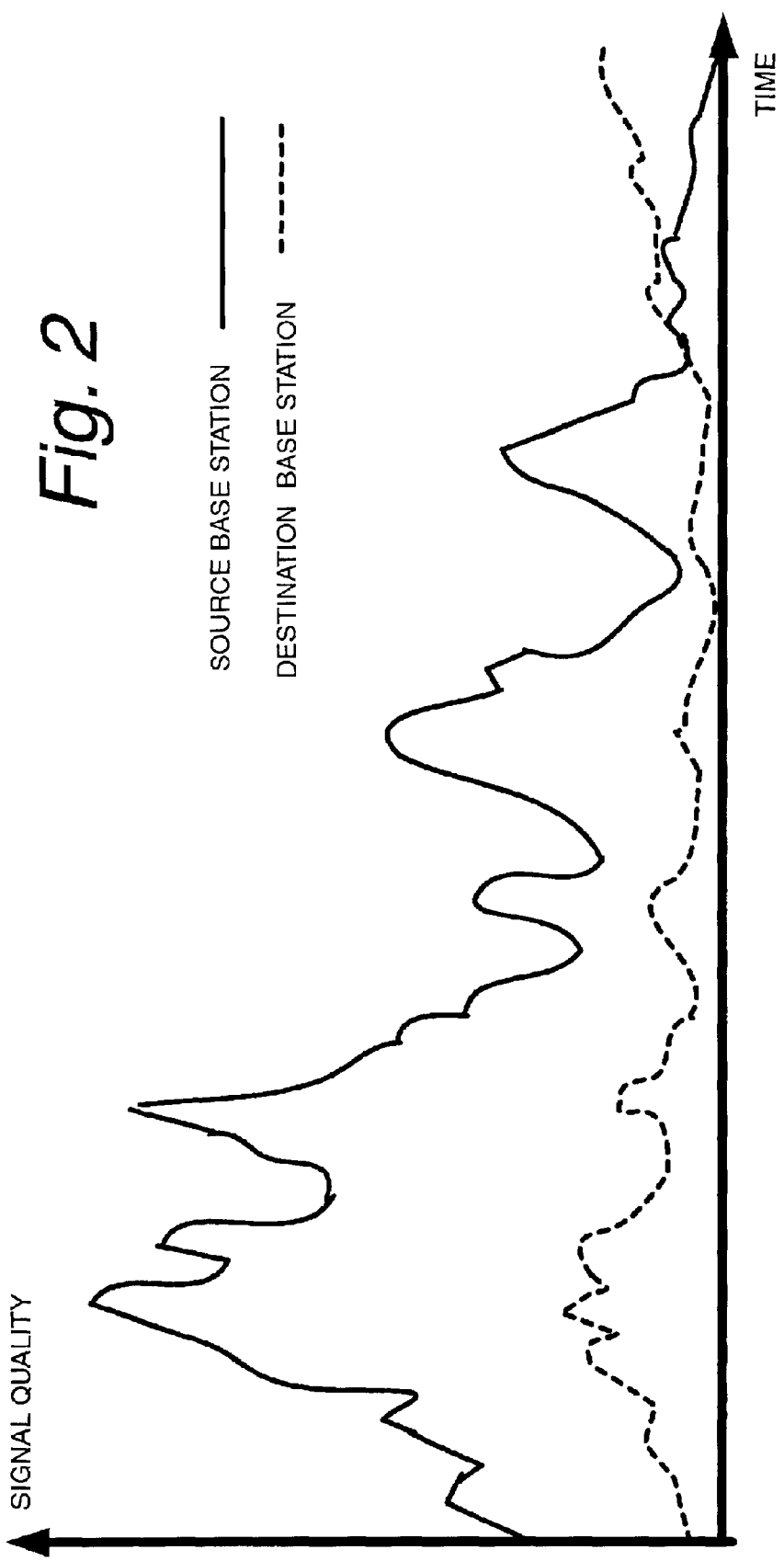

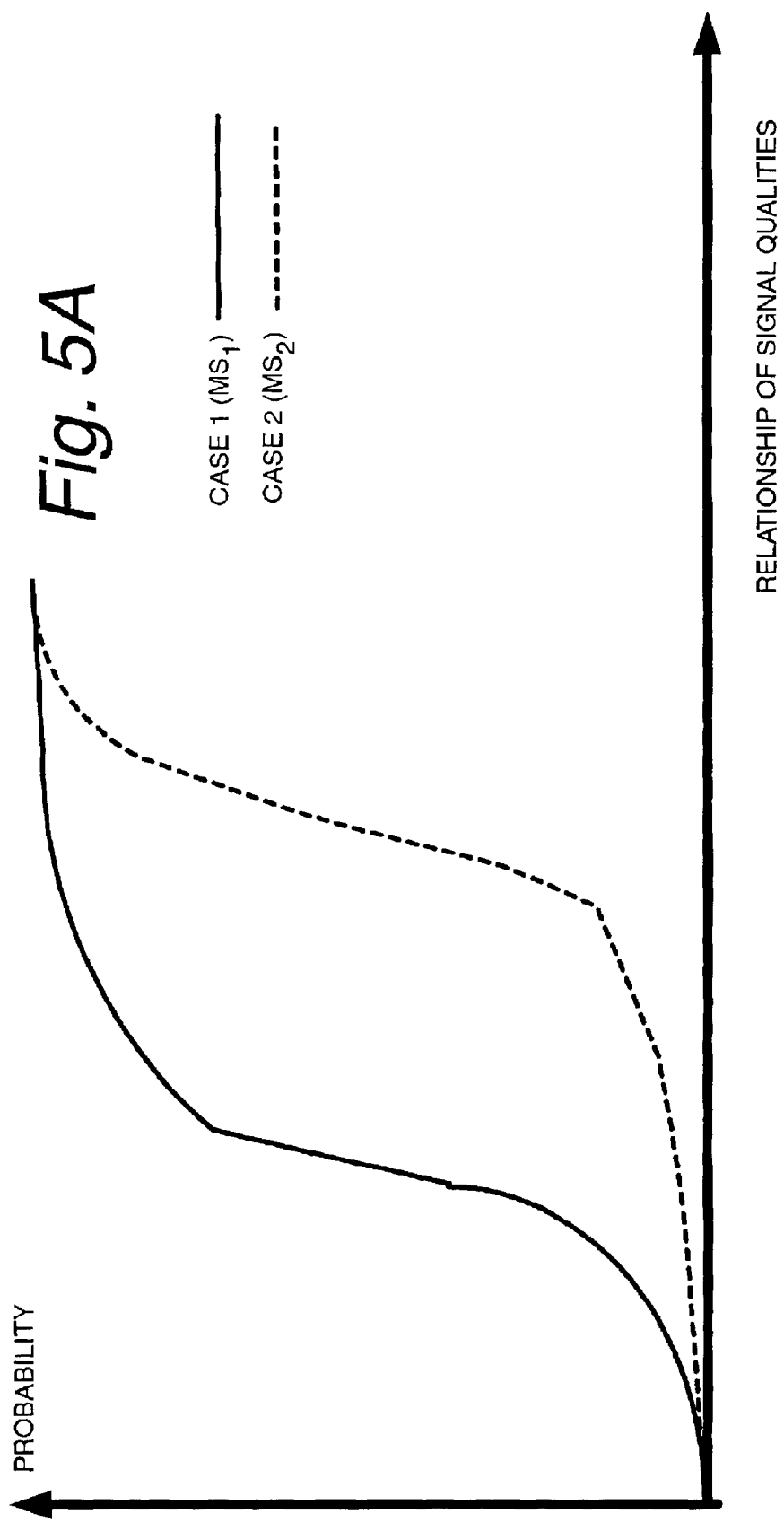

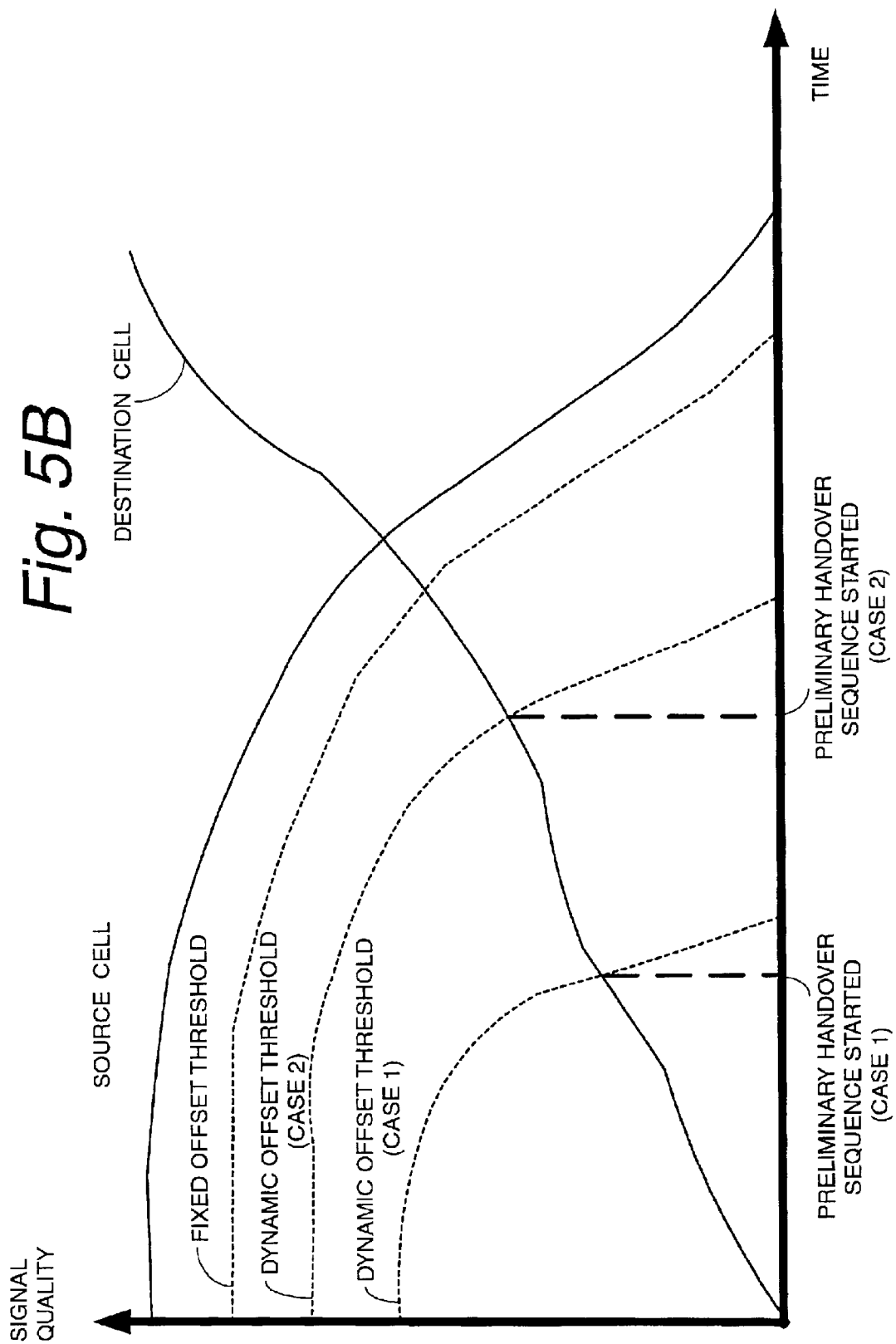

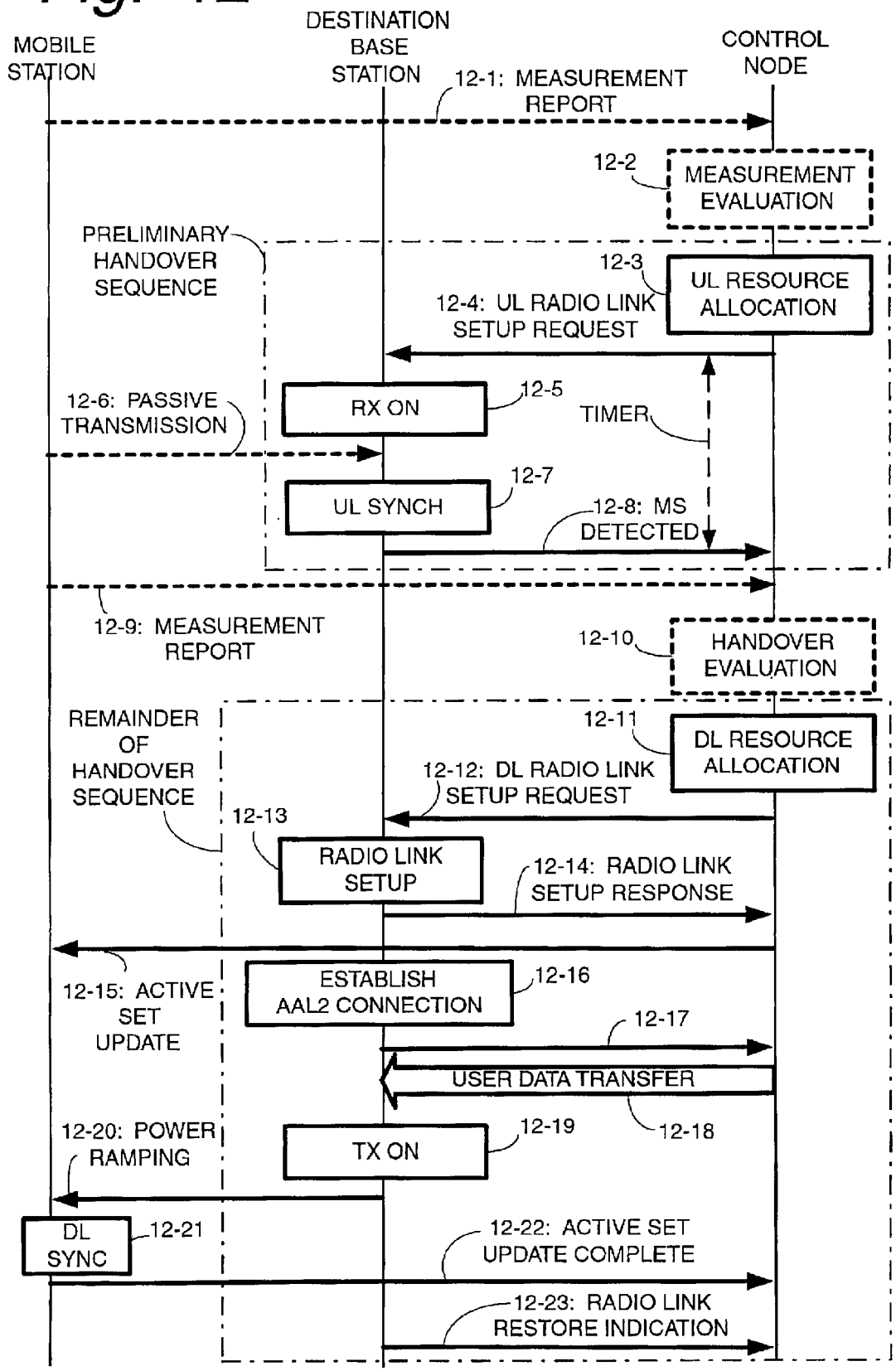

DYNAMIC OFFSET THRESHOLD FOR DIVERSITY HANDOVER IN TELECOMMUNICATIONS SYSTEM

This application claims the priority and benefit of U.S. Patent Provisional Application Ser. No. 60/250,473, filed Dec. 4, 2000, entitled "DYNAMIC OFFSET THRESHOLD FOR DIVERSITY HANDOVER IN TELECOMMUNICATIONS SYSTEM" and U.S. Patent Provisional Application 60/250,476, filed Dec. 4, 2000, entitled "PRELIMINARY PERFORMANCE OF HANDOVER FUNCTIONS IN TELECOMMUNICATIONS SYSTEM", and is related to simultaneously-filed U.S. patent application Ser. No. 09/931,280, entitled "PRELIMINARY PERFORMANCE OF HANDOVER FUNCTIONS IN TELECOMMUNICATIONS SYSTEM", all of which are incorporated herein by reference in their entirety.

BACKGROUND

1. Field of the Invention

The invention pertains to data communications systems, and particularly to diversity handover (e.g., soft handover) in a telecommunications system such as a wideband code division multiple access telecommunications system.

2. Related Art and other Considerations

In a typical cellular radio system, mobile stations (MS), also known as mobile user equipment units (UEs), communicate via a radio access network (RAN) to one or more core networks. The mobile stations (MSs)/user equipment units (UEs) can be mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station (also known in some networks as a "B-node" or "node-B"). A cell is a geographical area where radio coverage is provided by the radio base station equipment at a base station site. Each cell is identified by a unique identity, which is broadcast in the cell. The base stations communicate over the air interface (e.g., radio frequencies) with the mobile stations within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UTRAN is a third generation system which in some respects builds upon the radio access technology known as Global System for Mobile communications (GSM) developed in Europe. UTRAN is essentially a wideband code division multiple access (W-CDMA) system. An undertaking known as the Third Generation Partnership Project (3GPPP) has endeavored to evolve further UTRAN and GSM-based radio access network technologies.

As those skilled in the art appreciate, in W-CDMA technology a common frequency band allows simultaneous communication between a mobile station (MS) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the mobile stations (MSs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a mobile station (MS) need not switch frequency when handoff of a connection is made from one cell to another. As a result, a destination cell can support an additional leg of a connection to a mobile station (MS) at the same time the origination cell continues to service the original leg of the connection. Since the mobile station (MS) is always communicating through at least one cell during handover, there is no disruption to the call. Hence, the term "soft handover." In contrast to hard handover, soft handover is a "make-before-break" switching operation.

Suppose that a mobile station already has a leg of a connection established with a base station (the source base station) serving a cell (the source cell) in which the mobile station presently resides. Either periodically or as triggered by certain events, the mobile station measures and reports to a control node (e.g., a radio network controller [RNC]) the received signal strength of preselected transmissions (e.g., pilot signals) from various base stations. In the W-CDMA context, a measurement report sent from the mobile station to the control node includes signal strength measurements for cells (e.g., base stations) already in an "active set" (cells for which diversity handover is already applicable), as well as other monitored cells. As the mobile station travels toward a destination cell (served by a destination base station) which is not in the active set, the mobile station eventually hears the pilot signal from the destination base station, and includes the destination base station in its measurement report to the control node. Eventually a decision must be made by the radio access network whether to add a new leg of the connection with the mobile station (the new leg involving the destination base station) by initiating a soft handover sequence at the destination base station.

Traditionally the radio access network determines to initiate a handover sequence at the destination base station in accordance with a soft handover algorithm. In the W-CDMA context, the soft handover algorithm has various events here of interest. A first event (Event 1A) is Radio Link Addition, which occurs when the measured and filtered pilot signal from the destination base station (not in the active set) exceeds a certain handover threshold. That certain handover threshold, herein also known as a Fixed Offset Threshold, is a fixed offset from the best (greatest strength) pilot signal in the active set (e.g., the source cell), as set forth in Expression 1. The fixed offset is a properly chosen constant. A low fixed offset means that a fixed offset threshold is high, and consequently a high signal strength is required to start handover. For a high fixed offset, the converse occurs. A description of how the fixed offset is chosen in provided in Third Generation Partnership Project Technical Specification 25.331.

FixedOffsetThreshold=
　SignalQuality(Best Cell)−FixedOffset　　　　Expression 1

A second event (Event 1B) is Radio Link Removal, which occurs when the measured and filtered pilot signal from the destination base station falls below the threshold of Expression 1. For the events (such as Event 1A and Event 1B) to occur, typically the pilot signal must maintain its strength for a predetermined trigger time and a certain hysteresis value may be factored into the threshold expression. Moreover, for the Radio Link Addition event, the active set must not be full. A more detailed understanding of the W-CDMA soft handover algorithm, including other events and conditions, can be ascertained from *Radio Resource Management Strategies*, 3G TR 25.922, Ver. 0.5.0, September 1999, generated by the Third Generation Partnership Project, Technical Specification Group RAN, Working Group 2 (WG2).

The point where the handover sequence is started can be said to define the cell border between two cells. If the cell border is situated too far from the source base station, the mobile station might lose contact with the source base station before the handover is completed. In such a situation, the call is unfortunately dropped. Furthermore, to keep the signal quality at a reasonable level at the mobile station, the source base station and the mobile station have to increase the transmission power as the mobile station moves away from the source base station. Consequently, the interference in the current cell and to other neighboring cells increases, leading to lower system capacity. On the other hand, if the cell border is close to the source base station, but too far from the destination base station, the destination base station (instead of the source base station) has to start its transmission with a high output power.

With the conventional fixed offset threshold value of Expression 1, the point where a handover is started is essentially the same between the current cell and any of the cells not currently in the active set. Thus, there is no possibility of controlling when to start a handover between two specific cells, and many of the handovers may be started at non-optimal points.

The conventional handover sequence performed by the destination base station involves various activities, usually commencing with allocating resources, and then subsequently, e.g., activating a receiver at the destination base station to be associated with the mobile station, followed by L1 synchronization with the mobile station. However, some of these handover sequence activities, such as L1 synchronization, are considerably complex, process intensive, and time consuming. Such characteristics of these handover sequence activities militate against the overall network goal of efficiency, e.g., of avoiding delay (whether it be call setup delay, delay at channel switching, delay at handover, etc.). In fact, one common denominator and a major reason for delay in many traffic situations is the time required to perform L1 synchronization in different scenarios, including diversity handover.

Various prior art systems (such as the Ericsson CMS88 and CMS30 TDMA systems) have employed verification receivers which enable a target cell to verify the existence of a mobile station, by synchronizing the verification receiver to the mobile station. In essence, output from the verification receiver advises whether the mobile station can be detected in the receiving cell or not. In such systems, a positive verification result is a condition for proceeding with the handover sequence.

U.S. Pat. No. 6,052,598 uses a series of received signal strength measurements of a mobile unit to extrapolate a time at which that mobile unit would have a handover in accordance with fixed offset thresholds, and affords an opportunity to allocate wireless resources for the mobile unit in anticipation of the extrapolated handover.

U.S. Pat. No. 5,530,912 provides, within a cell, a handover region and a pre-handover zone relative to handover to an adjacent cell. When a mobile station is in the pre-handover zone, a free channel is reserved in the adjacent cell. The free channel in the adjacent cell is not granted until the mobile station moves into the handover region.

What is needed, therefore, and an object of the present invention, is a technique for expediting time-intensive handover activities and thereby reducing diversity handover delay.

BRIEF SUMMARY OF THE INVENTION

A telecommunications system has a source base station and a destination base station, and a handover unit having a dynamic offset threshold determination unit which establishes a dynamic offset threshold for starting soft handover. When the dynamic offset threshold for soft handover is exceeded, a preliminary portion of a handover sequence is initiated at the destination base station. The preliminary portion of the handover sequence is initiated so that a time-critical handover sequence activity (such as L1 uplink synchronization) is well underway, if not completed, by the time the soft handover is actually needed. The dynamic offset threshold for starting handover is based on a probability that the mobile station will engage in the handover. The probability is a statistical probability that handover will actually occur and can be based on handover history of other mobile stations previously and similarly traveling and of the same signal strength.

Another portion of the soft handover sequence (e.g., a remaining portion of the soft handover sequence) is initiated when the signal strength from the destination base station as received at the specified mobile station has a predetermined relationship to (e.g., exceeds) a fixed offset threshold.

In an example, non-limiting embodiment of the invention, the dynamic offset threshold determination unit initiates at least the preliminary portion of the soft handover sequence when the signal strength of the destination base station as received at the specified mobile station is not less than a dynamic offset threshold. The dynamic offset threshold is a difference between the signal strength of the source base station as received at the specified mobile station and a dynamic offset. The dynamic offset is a function of a fixed offset and the probability of the specified mobile station fulfilling the handover criteria.

The probability upon which the dynamic offset threshold is determined is a function of signal strength of the destination base station as received at the specified mobile station. More preferably, the probability upon which the dynamic offset threshold is determined is both a function of signal strength of the destination base station as received at the specified mobile station and a function of signal strength of the source base station as received at the specified mobile station.

In an example deployment of the invention, the dynamic offset threshold determination unit is situated at a control node of the telecommunications system, such as a radio network control (RNC) node. The specified mobile station sends to the control node a measurement report of the signal strength of the destination base station and the source base station as received at the specified mobile station, thereby enabling the dynamic offset threshold determination unit to makes its dynamic offset threshold determination.

In accordance with one aspect of the invention, when the dynamic offset threshold determination unit initiates at least the preliminary portion of the handover sequence, the node at which the dynamic offset threshold determination unit is situated sends a message to the destination base station for initiating at least the preliminary portion of the handover sequence at the destination base station.

The invention allows a soft handover procedure to be executed at a point in time when the cost of execution is as low as possible, thereby leading to increased capacity in the network and lower risks for dropped calls at soft handover.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1A, FIG. 1B, FIG. 1C, and FIG. 1D are diagrammatic views showing various stages of movement of a mobile station through certain radio access network portions of a telecommunications system.

FIG. 2 is a graph showing a certain scenario of signal strength over time from a source base station and a destination base station.

FIG. 5A is graph showing probability of handover as a function of a relationship between signal qualities of a source cell and a destination cell for mobile stations entering a destination cell from differing directions.

FIG. 5B is a graph showing a time difference for initiating the handover sequence, contrasting initiation of the handover sequence in accordance with a dynamic offset threshold and a fixed offset threshold.

FIG. 12 is a diagrammatic view reflecting initiation and various aspects of the preliminary portion of a handover sequence performed at a destination base station and an another portion of a handover sequence.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail.

Figure 1A:
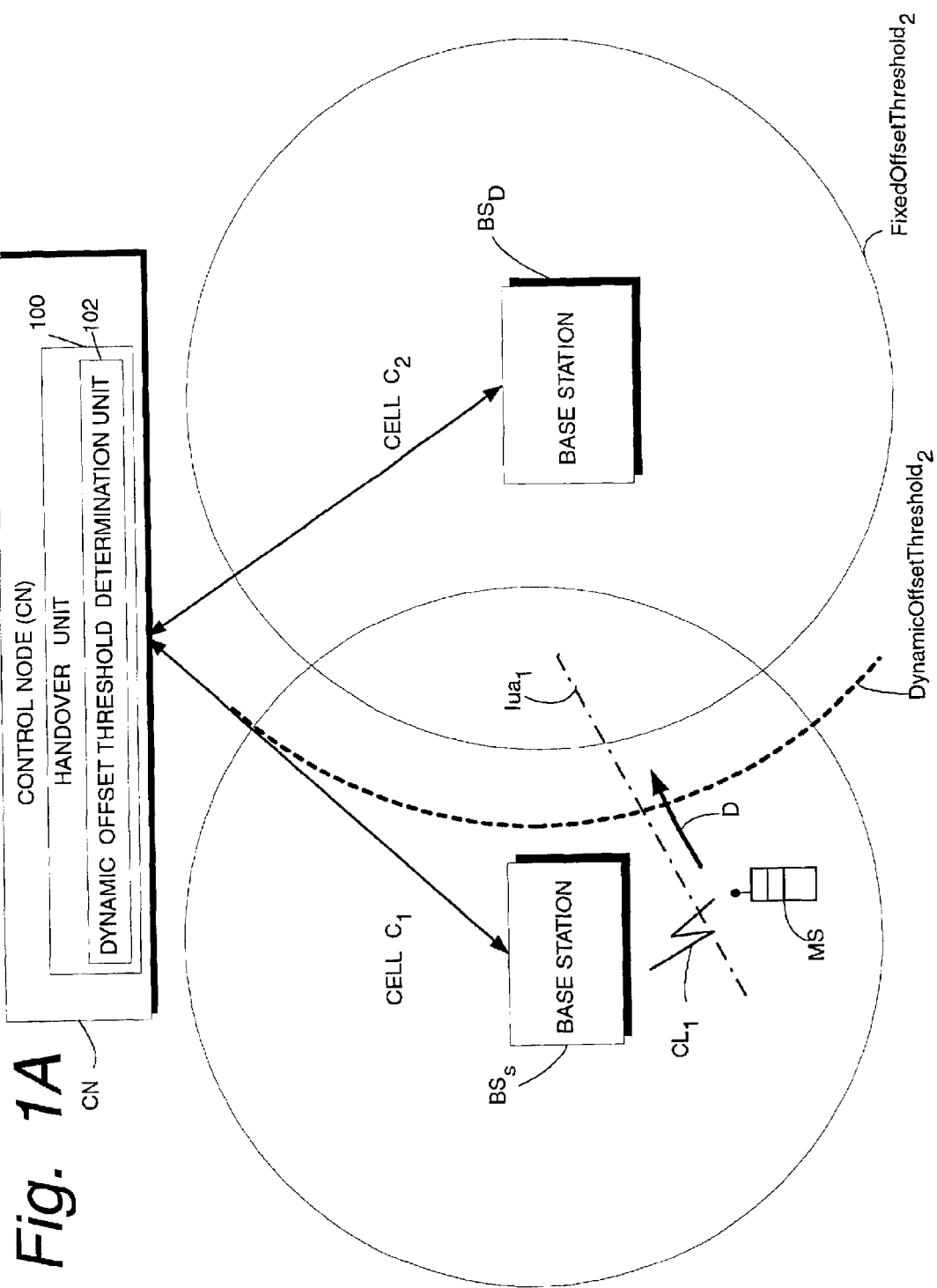

FIG. 1A shows portions of a telecommunications system including a source base station $BS_S$, a destination base station $BS_D$, and a control node CN. The source base station $BS_S$ serves a cell $C_1$; the destination base station $BS_D$ serves a cell $C_2$. The control node CN controls the source base station $BS_S$ and the destination base station $BS_D$. Control node N has a diversity handover unit 100 which governs the addition and removal of leg to the connections controlled by control node N. In other words, the diversity handover unit 100 governs what cells (e.g., what base stations) are to be included in or deleted from the active set.

At the time shown in FIG. 1A, a mobile station (MS) has a call connection leg $CL_1$ over the air interface $Iua_1$ only with source base station $BS_S$. In FIG. 1A, mobile station (MS) is moving in the direction of arrow D, and has not yet reached a cell boundary of destination cell $C_2$. The cell boundary of destination cell $C_2$, depicted by line FixedOffsetThreshold$_2$ in FIG. 1A, is (as described above) related to the fixed offset threshold value of Expression 1, and thus represents the position at which (when crossed by a mobile station) conventional handover criteria is satisfied for the mobile station MS, and hence the position at which a conventional handover sequence would be begun for mobile station MS at destination base station $BS_D$.

Figure 1C:
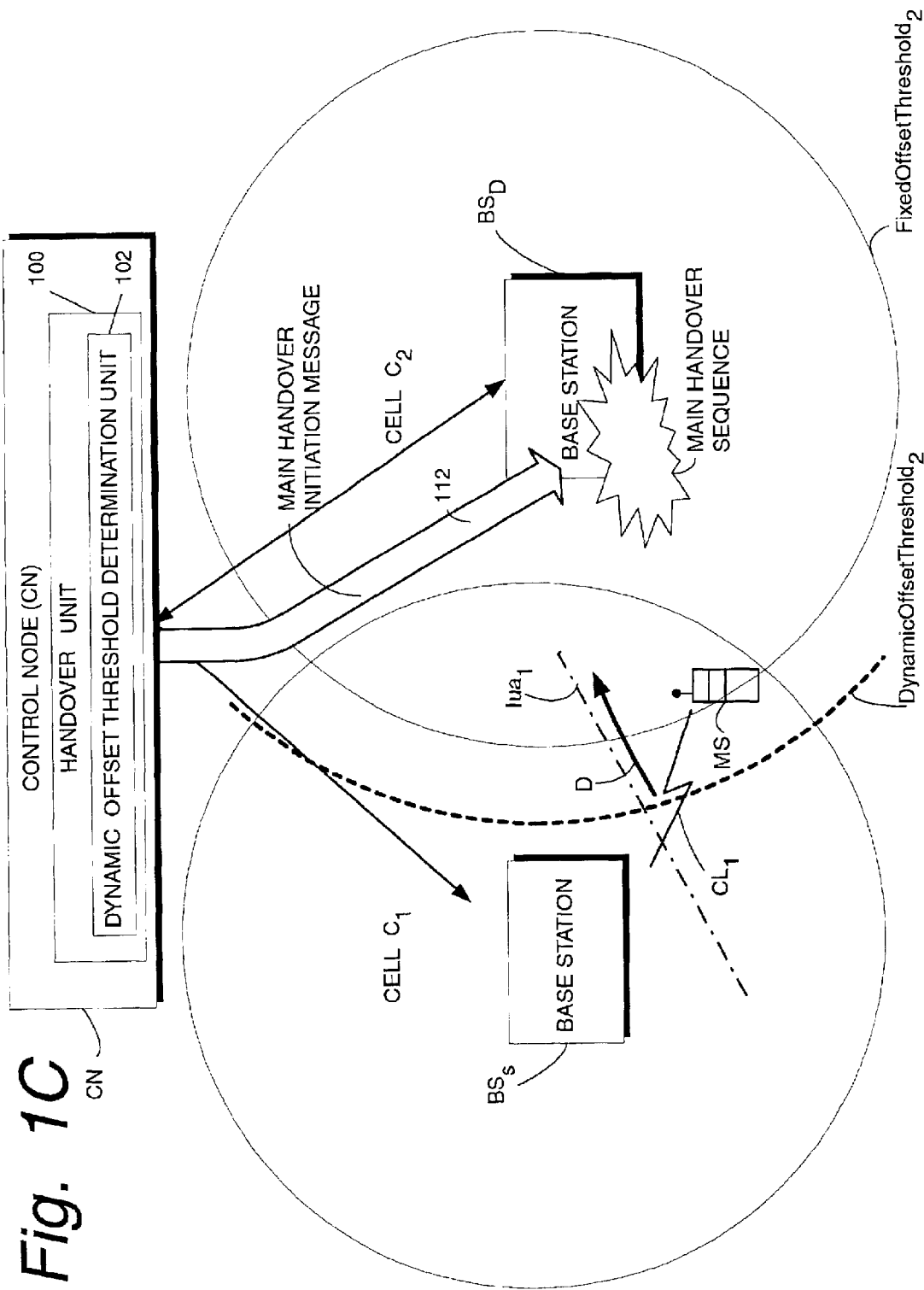

In accordance with the present invention, and as depicted in FIG. 1B, a preliminary portion of a handover sequence at destination base station $BS_D$ involving the mobile station MS is begun before the mobile station MS reaches the line FixedOffsetThreshold$_2$. In fact, the preliminary portion of the handover sequence is begun when the mobile station MS reaches a position corresponding to the line DynamicOffsetThreshold$_2$ shown in FIG. 1B. As explained subsequently, the preliminary portion of the handover sequence involves such activities as the destination base station $BS_D$ establishing a receiver for listening for mobile station MS and the destination base station $BS_D$ performing L1 uplink synchronization for mobile station MS. Should the mobile station MS continue in the direction of arrow D to cross the line FixedOffsetThreshold$_2$ as shown in FIG. 1C, a modified main handover sequence is performed at the destination base station $BS_D$ for the mobile station MS. The modified handover sequence includes one or more conventional handover sequence operations not already performed during the preliminary portion of the handover sequence (e.g., the remaining conventional handover sequence operations not already performed). Performance of the modified main handover sequence results in establishment of a second connection leg $CL_2$ with mobile station (MS), the second leg being through the destination base station $BS_D$ and over an air interface $Iua_2$.

As its very name implies, the line DynamicOffsetThreshold$_2$ is not statically positioned, but rather varies or shifts. Criteria and an expression for determining the position of the line DynamicOffsetThreshold$_2$ is subsequently provided.

The initiation of the preliminary portion of the handover sequence is triggered by a dynamic offset threshold determination unit 102 of the diversity handover unit 100. As explained below, the dynamic offset threshold used by the dynamic offset threshold determination unit 102 to initiate the preliminary portion of the handover sequence is based on a probability of that the mobile station (MS) will engage in a soft handover.

In an example, non-limiting embodiment of the invention, the dynamic offset threshold determination unit initiates the preliminary handover sequence when the signal strength of the destination base station as received at the specified mobile station is not less than a dynamic offset threshold. The dynamic offset threshold, reflected by line DynamicOffsetThreshold$_2$ in FIG. 1B, is a difference between the signal strength of the source base station as received at the specified mobile station and a dynamic offset, as shown in Expression 2.

$$\text{DynamicOffset} = \text{FixedOffset} + (K * \text{Probability(Handover)}) \quad \text{Expression 2}$$

In Expression 2, K is a constant. The constant K of Expression 2 is used both to decide how significant the probability function will be for the total offset, and to map the probability to a suitable value.

The dynamic offset utilized in Expression 2 is, in turn, a function of the handover criteria and the probability of the specified mobile station fulfilling the handover criteria, as shown by Expression 3.

$$\text{DynamicOffsetThreshold} = \text{SignalQuality(SourceCell)} - \text{DynamicOffset} \quad \text{Expression 3}$$

In accordance with one mode of the invention, one way to decide the probability for handover is to let the handover probability to a destination cell be a function of the signal quality as measured from that destination cell, as expressed (for example) by Expression 4.

$$P(H(SQ(x))) = N_{max}/N_{SQ(x)} \quad \text{Expression 4}$$

In Expression 4, $P(H(SQ(x)))$ is the probability that reaching a certain Signal Quality (e.g., Signal Quality(x)) will result in a handover (H); $N_{max}$ is the number of users which have reached a maximum signal quality; and $N_{SQ(x)}$ is the number of users which have reached that certain Signal Quality (e.g., Signal Quality(x)). The maximum signal quality is the highest signal quality any users have measured from the destination cell (e.g., from the destination base station), and can be ascertained from previous measurement reports (e.g., from all users) regarding signal strength from the destination base station. Thus, by looking at the signal quality from the destination cell for a number of users, the system can tell how many of the users will reach a certain signal quality. The diversity handover unit 100 thus keeps track, and stores in a memory, the number of users which have reached a maximum signal quality ($N_{max}$) and the number of users which have reach each level of Signal Quality. With this information the dynamic offset threshold determination unit 102 can determine, at any signal quality level, how many users will reach an even higher signal quality level.

Thus, the diversity handover unit 100 can decide at which signal quality the mobile stations reach a crossroads. A crossroads is point, before a mobile station (MS) enters a cell, at which there is an equal probability that (1) the mobile station (MS) will undergo handover; and (2) the mobile station (MS) will not undergo handover. After the crossroad is passed, most of the users will continue toward the destination cell and eventually make a handover.

However, the signal quality from the destination cell as employed in the mode of Expression 4 may, in some instances, not be enough to decide adequately the probability for a handover. In a case where the mobile has good radio connections to both the source base station and destination base station before reaching the crossroad (for example on a large hill with line of sight to both base stations), the signal strength from the destination base station can be rather high. This high level can still be much lower than the signal quality of the source base station, and therefore no handover is started. In this regard, see FIG. 2, which is a graph of signal quality over time, showing an example scenario of the signal quality both from the source base station and the destination base station, and particularly showing the signal quality from the destination base station be rather high but still not triggering a soft handover. Later, at the point where the handover is eventually executed, the signal strength from the destination base station might be much lower, but still high enough, compared to the source base station, for the handover sequence to be started. In those cases the probability function will be useless, since all the users will reach the maximum signal quality level from the destination base station before the crossroad and the probability function will always yield one.

In view of the foregoing, a preferred mode for the probability function to depend on both the signal quality of the source base station and the signal quality of the destination base station. The relationship R between these two signal qualities can be defined by Expression 5.

$$R = (\text{SignalQuality(DestinationCell)}) / (\text{SignalQuality(SourceCell)}) \quad \text{Expression 5}$$

The fact that the signal quality from the destination cell is high does not imply that the relationship is high. Thus, the problem found, when only looking at the signal quality from the destination cell, is solved. The relationship will increase as the measured signal quality from the destination cell gets higher, compared to the source cell. It will be enough to keep track of the relationship until the point where signal quality from the destination cell gets as good as the one from the source cell, i.e., the relationship is 1.

The probability of a handover to a destination cell in accordance with this second, preferred mode is thus shown by Expression 6.

$$P(H(R(x))) = N_{max}/NR(x) \quad \text{Expression 6}$$

In Expression 6, $P(H(R(x)))$ is the probability of a handover (H); $N_{max}$ is the number of users which reach a relationship R of 1; and $NR(x)$ is the number of users which have reached a certain relationship $R(x)$.

Figure 3:
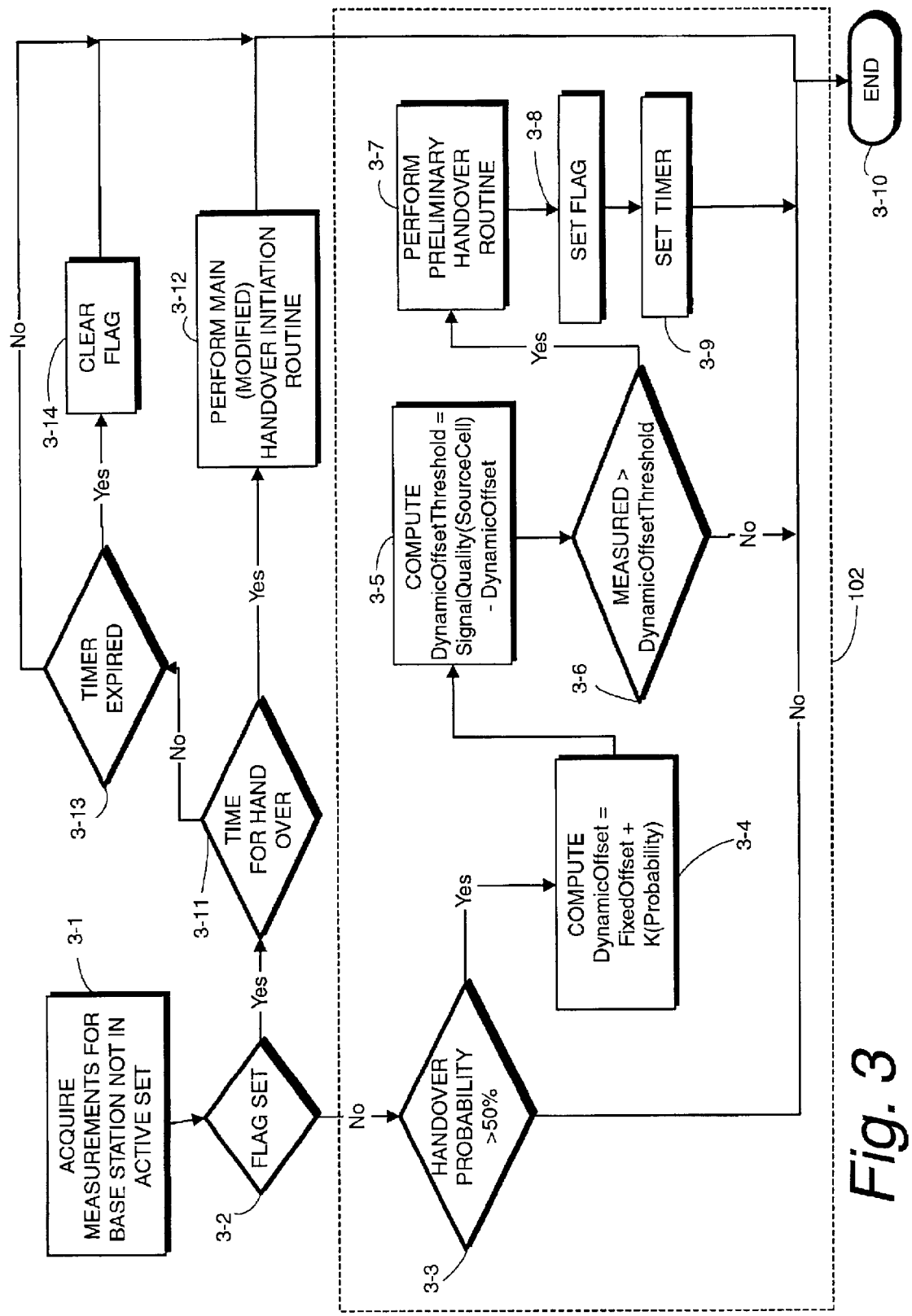
FIG. 3 is a flowchart showing certain example steps performed by a dynamic offset threshold determination unit according to an embodiment of the invention.

FIG. 3 shows certain example basic steps performed by diversity handover unit 100, including its dynamic offset threshold determination unit 102, according to an embodiment of the invention. Step 3-1 depicts the fact that diversity handover unit 100 acquires signal quality measurements for a base station not in the active set, e.g., for destination base station $BS_D$. Of course, the diversity handover unit 100 can, and likely does, receive signal quality measurements for base stations in the active set as well, but the thrust of the present activity is a determination whether to add a new base station to the active set, which means that the signal quality of the candidate base station must be obtained via the measurements. Some comments regarding the timing of reporting of signal quality measurements are provided subsequently.

At step 3-2 the diversity handover unit 100 checks whether a preliminary handover routine flag, simply known as the "flag", has been set. It will be assume initially that the preliminary handover routine flag has not been set, which leads to execution of step 3-3.

Step 3-3 is the first step of dynamic offset threshold determination unit 102, basic steps of dynamic offset threshold determination unit 102 being framed by broken line 102 in FIG. 3. At step 3-3, the dynamic offset threshold determination unit 102 checks if the handover probability is greater than a predetermined percentage (e.g., 50%, meaning that the mobile station (MS) has crossed over the crossroad). As indicated previously, the handover probability can be a function of signal strength of the destination base station (as explained above with reference to Expression 4). Alternatively, as another example, the handover probability can be both a function of signal strength of the destination base station and a function of signal strength of the source base station (as explained above with reference to Expression 5). In any event, as part of step 3-3 the dynamic offset threshold determination unit 102 checks the stored statistics relating to previous instances of mobile stations which have achieved the signal strength now measured by the mobile station (MS) for the pilot signal of the candidate base station, and determines on a predetermined basis (e.g., Expression 4 or Expression 5) the probability that a soft handover to the candidate base station will be preformed for the presently reporting mobile station (MS).

If the presently reporting mobile station (MS) does not have a handover probability greater than the predetermined percentage (e.g., 50%), execution of the dynamic offset threshold determination unit 102 ends as reflected by symbol step 3-10. On the other hand, if the presently reporting mobile station (MS) does have a handover probability greater than the predetermined percentage, step 3-4 through step 3-6, and possibly step 3-7 through step 3-9 as well, are performed by dynamic offset threshold determination unit 102.

Step 3-4 involves the dynamic offset threshold determination unit 102 computing the DynamicOffset of Expression 2. Then dynamic offset threshold determination unit 102 proceeds to compute the DynamicOffsetThreshold in accordance with Expression 3. Then, having computed the DynamicOffsetThreshold for the destination cell, at step 3-6 the dynamic offset threshold determination unit 102 determines whether the measured and filtered pilot signal received by the mobile station (MS) from destination base station $BS_D$ exceeds the DynamicOffsetThreshold. If the DynamicOffsetThreshold is exceeded, at step 3-7 the dynamic offset threshold determination unit 102 performs its preliminary handover routine.

Figure 1D:
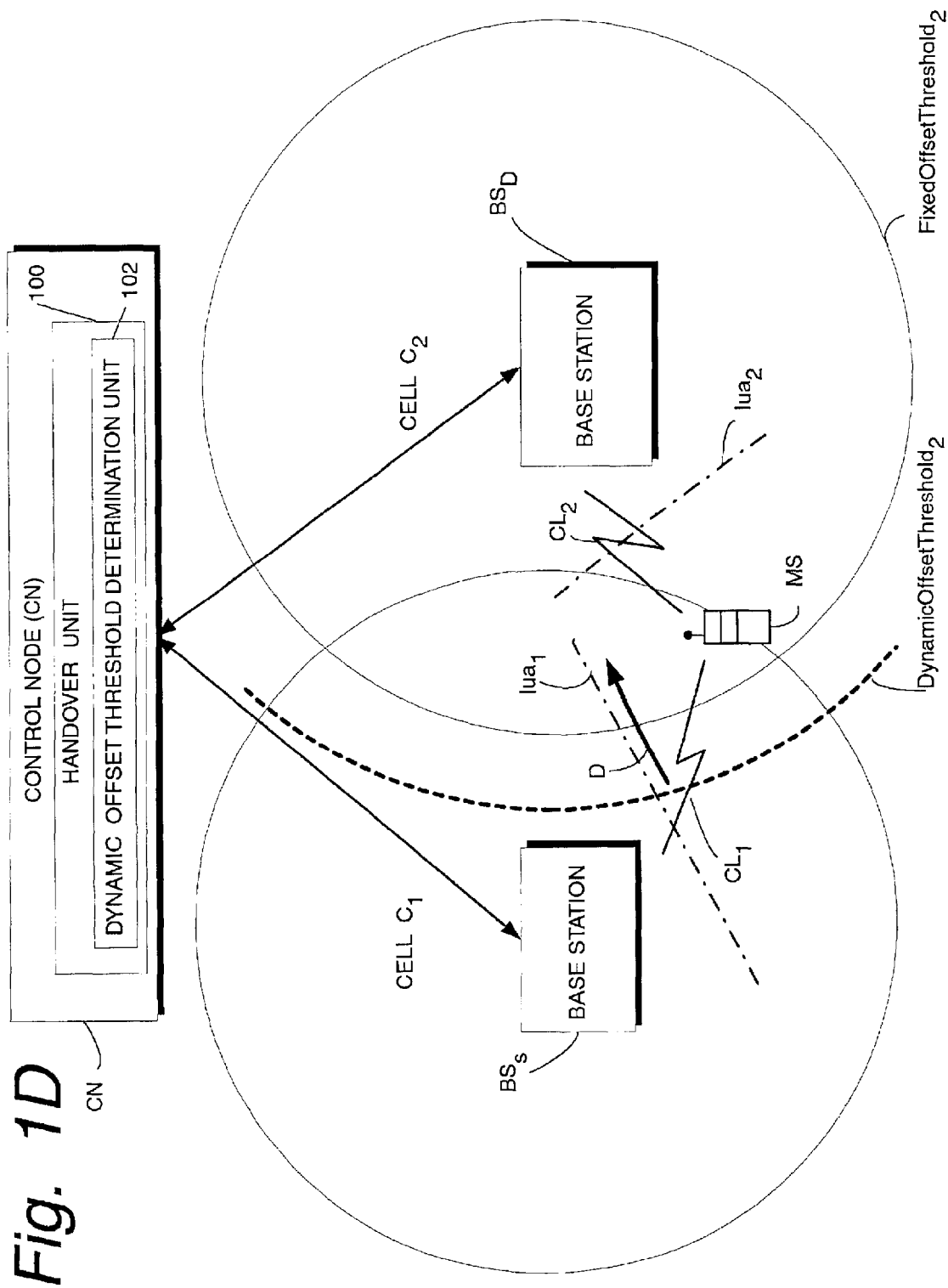

Performance at step 3-7 of the preliminary handover routine involves dynamic offset threshold determination unit 102 sending a preliminary handover initiation message 110 to the destination base station $BS_D$, as shown in FIG. 1. The preliminary handover initiation message 110 transmits to the destination base station $BS_D$ the information necessary for the destination base station $BS_D$ to perform its preliminary portion of the handover sequence for the mobile station (MS), and authorizes the destination base station $BS_D$ to initiate its preliminary portion of the handover sequence. The information necessary to the destination base station $BS_D$ for performing the preliminary portion of the handover sequence includes the scrambling code, as well as the identity of the mobile station (MS) [the scrambling code itself can serve as such an identity].

The information necessary for performing the preliminary portion of the handover sequence can be included in a modified Radio Link Setup message. The modified Radio Link Setup message includes a flag that tells the destination base station if it is the preliminary or remaining portion of the handover sequence that is to be executed.

After diversity handover unit 100 performs its preliminary handover routine, the pre-routine flag is set at step 3-8. After beginning its preliminary portion of the handover sequence, the destination base station $BS_D$ sets a timer to determine whether the mobile station (MS), having crossed the DynamicOffsetThreshold, crosses the FixedOffsetThreshold. If the timer set by the base station $BS_D$ expires, the destination base station $BS_D$ assumes that the mobile station (MS) turned back (changed direction to go away from rather than toward the destination base station $BS_D$) or terminated the call, and cancels out the steps taken in its preliminary portion of the handover sequence. Accordingly, to reflect this potential cancellation of the preliminary portion of the handover sequence by the destination base station $BS_D$, the dynamic offset threshold determination unit 102 sets a timer at step 3-9. After setting the timer, the dynamic offset threshold determination unit 102 can end its execution relative to this measurement report for the reporting mobile station (MS).

If, after receipt of the measurement report of step 3-1, the diversity handover unit 100 determines at step 3-2 that the preliminary handover routine flag has been set, step 3-11 is next performed. Step3-11 involves a determination whether the reporting mobile station (MS) has crossed the FixedOffsetThreshold, and is thus ready for the destination base station $BS_D$ to perform a modified handover sequence (e.g., the remaining aspects of the conventional handover sequence which were not included in the preliminary portion of the handover sequence). If the reporting mobile station has traveled to a point where it is appropriate for the destination base station $BS_D$ to execute the modified handover sequence, at step 3-12 the modified handover initiation routine is performed by diversity handover unit 100. Among the activities included in the modified handover initiation routine performed by diversity handover unit 100 is transmission of a handover initiation message to destination base station $BS_D$, as reflected by handover initiation message 112 shown in FIG. 1C. Upon receipt of the handover initiation message 112, the destination base station $BS_D$ performs its modified handover sequence. The information necessary to the destination base station $BS_D$ for performing the modified handover sequence includes the scrambling code for the mobile station and the identity of the mobile station (MS) as previously mentioned. Various aspects of the modified handover sequence are below discussed, e.g., with reference to FIG. 12.

If it is determined at step 3-11 that it is not yet time to perform the remainder of the handover sequence, a check is made at step 3-13 whether the timer (set at step 3-9) has expired. If the timer set at step 3-9 has expired, the dynamic offset threshold determination unit 102 realizes that the destination base station $BS_D$ now considers that the reporting mobile station (MS) has wandered away from a handover or hesitated inroute, and thus has cancelled steps taken in the preliminary portion of the handover sequence for the reporting mobile station (MS). Knowing therefore that the destination base station $BS_D$ has cancelled such preliminary portion of the handover sequence steps, the dynamic offset threshold determination unit 102 must again consider the preliminary portion of the handover sequence unpreformed for the reporting mobile, and therefore clears the preliminary handover routine flag at step 3-14. After clearing the flag at step 3-14, or after determining at step 3-13 that the timer has not expired, the dynamic offset threshold determination unit 102 concludes its processing with respect to the current measurement report (as depicted by the symbol of step 3-10).

The steps of FIG. 3 are thus executed as appropriate upon receipt of the signal quality measurement reports for the candidate base station. It should be understood, with respect to a given mobile station (MS), that the steps of FIG. 3 may be performed for more than one destination base station $BS_D$, as there may be several candidate destination base station $BS_D$ to which the mobile station is listening and for which connection legs may be added.

Figure 4:
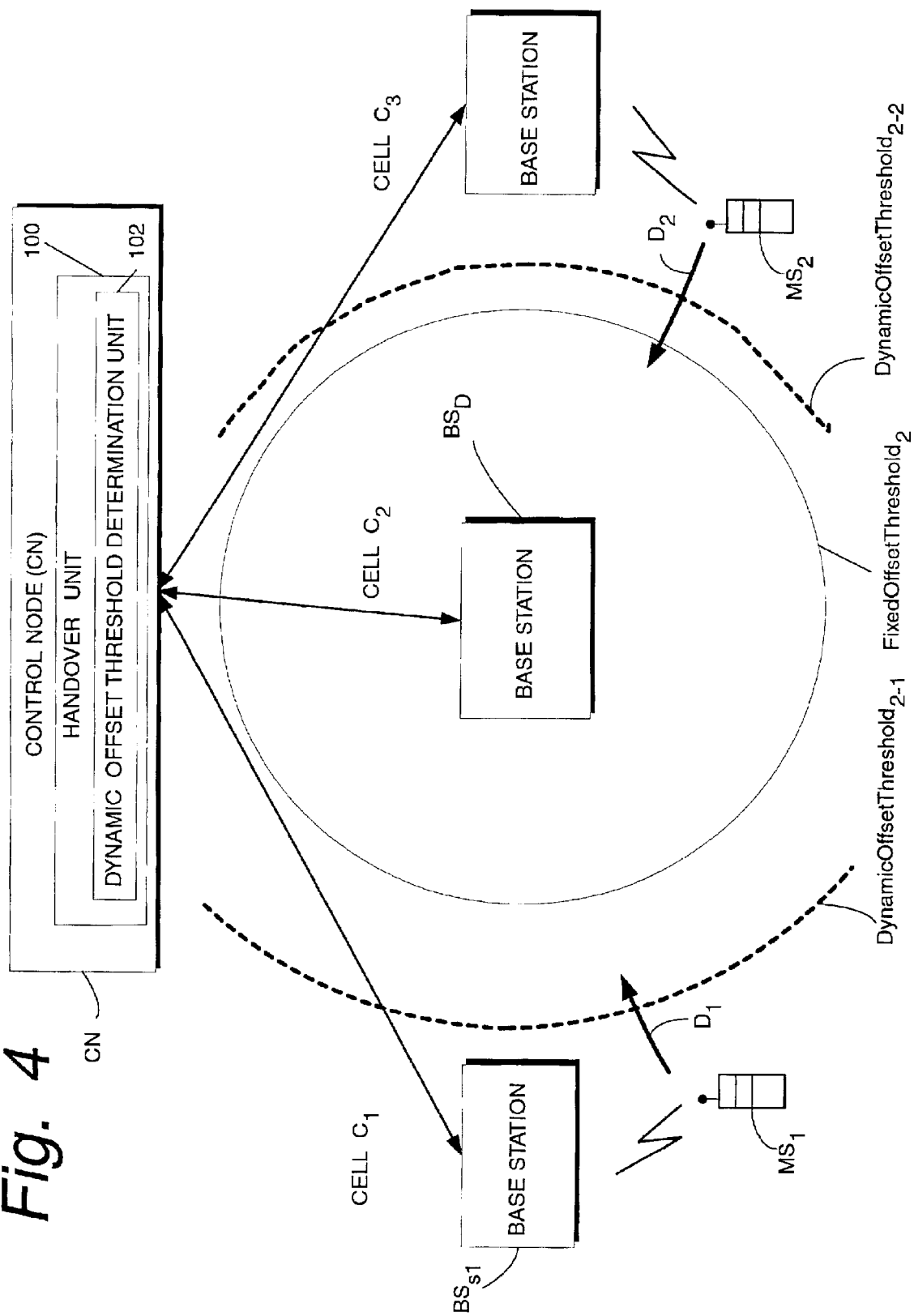
FIG. 4 is a diagrammatic view showing how a dynamic offset threshold for a cell differs depending on direction of entry into the cell.

As evident from the foregoing, in accordance with the present invention the dynamic offset threshold determines the start of the handover process, particularly the start of the preliminary portion of the handover process. Interestingly, the dynamic offset threshold will differ between different pairs of cells. Depending on the probability that a handover from a source base station to a destination base station will take place, the dynamic offset threshold between two specific pairs of cells differs. To illustrate, FIG. 4 depicts a situation in which two mobile stations, $MS_1$ and $MS_2$, are moving from different cells $C_1$ and $C_3$ toward destination cell $BS_D$. The first mobile station ($MS_1$) has a first leg of connection with base station $BS_1$ which serves cell $C_1$, while a second mobile station ($MS_2$) has a first leg of connection with base station $BS_3$ which serves cell $C_3$. Both mobile stations $MS_1$ and $MS_2$ are moving toward destination cell $BS_D$ as represented by respective arrows $D_1$ and $D_2$, and accordingly towards a potential handover to destination cell $BS_D$. However, the line DynamicOffsetThreshold$_{2-1}$ for the mobile station ($MS_1$) coming from cell $C_1$ is situated differently than the line DynamicOffsetThreshold$_{2-2}$ for the mobile station ($MS_2$) coming from cell $C_3$. In other words, the line DynamicOffsetThreshold$_{2-1}$ for the mobile station ($MS_1$) coming from cell $C_1$ has a different (e.g., larger) radius than the line DynamicOffsetThreshold$_{2-2}$ for the mobile station ($MS_2$) coming from cell $C_3$. Thus, in accordance with the present invention, when approaching a destination cell (e.g., a destination base station) the DynamicOffsetThreshold can differ depending upon from which direction the destination cell is entered.

Thus, the probability functions utilized with respect to the two mobile stations $MS_1$ and $MS_2$ shown in FIG. 4 differ, and thus the position of the crossroads for each mobile station MS. See, for example, FIG. 5A, which graphically illustrates likely probability of handover for the two cases of the two mobile stations $MS_1$ and $MS_2$ as a function of a relationship between the signal qualities from the source base station and the destination base station. When the relationship between the signal qualities from the source base station and the base station increases, it is more probable that a handover will be made, and thus the difference between the FixedOffsetThreshold and the DynamicOffsetThreshold increases.

FIG. 5B contrasts a time difference for initiating the handover sequence in accordance with the respective thresholds represented by the dynamic offset threshold and the fixed offset threshold. Moreover, FIG. 5B illustrates the dynamic offset threshold both for case 1 of FIG. 4 (e.g., for mobile station ($MS_1$)) and for case 2 of FIG. 4 (e.g., for mobile station ($MS_2$))

The preliminary portion of the handover sequence includes steps of starting a receiver for the mobile station (MS) at the destination base station $BS_D$ and performing L1 synchronization at the destination base station $BS_D$ for the mobile station (MS). Neither the starting of the receiver nor the synchronization operation cause any additional radio interference, but there is nevertheless a cost in pre-allocated hardware resources required for performing these tasks of the preliminary portion of the handover sequence. Therefore, it is important that the mobile station (MS) be close enough to the destination base station $BS_D$ when the preliminary portion of the handover sequence is started, so that the destination base station $BS_D$ is able to detect the mobile station (MS). Otherwise, hardware resources at the destination base station $BS_D$ are wasted in performing the preliminary portion of the handover sequence. The constant K of Expression 2 is chosen high enough to make certain that the preliminary portion of the handover sequence is not started too late, but low enough so that the handover will not be started too soon in accordance with these considerations.

Figure 10:
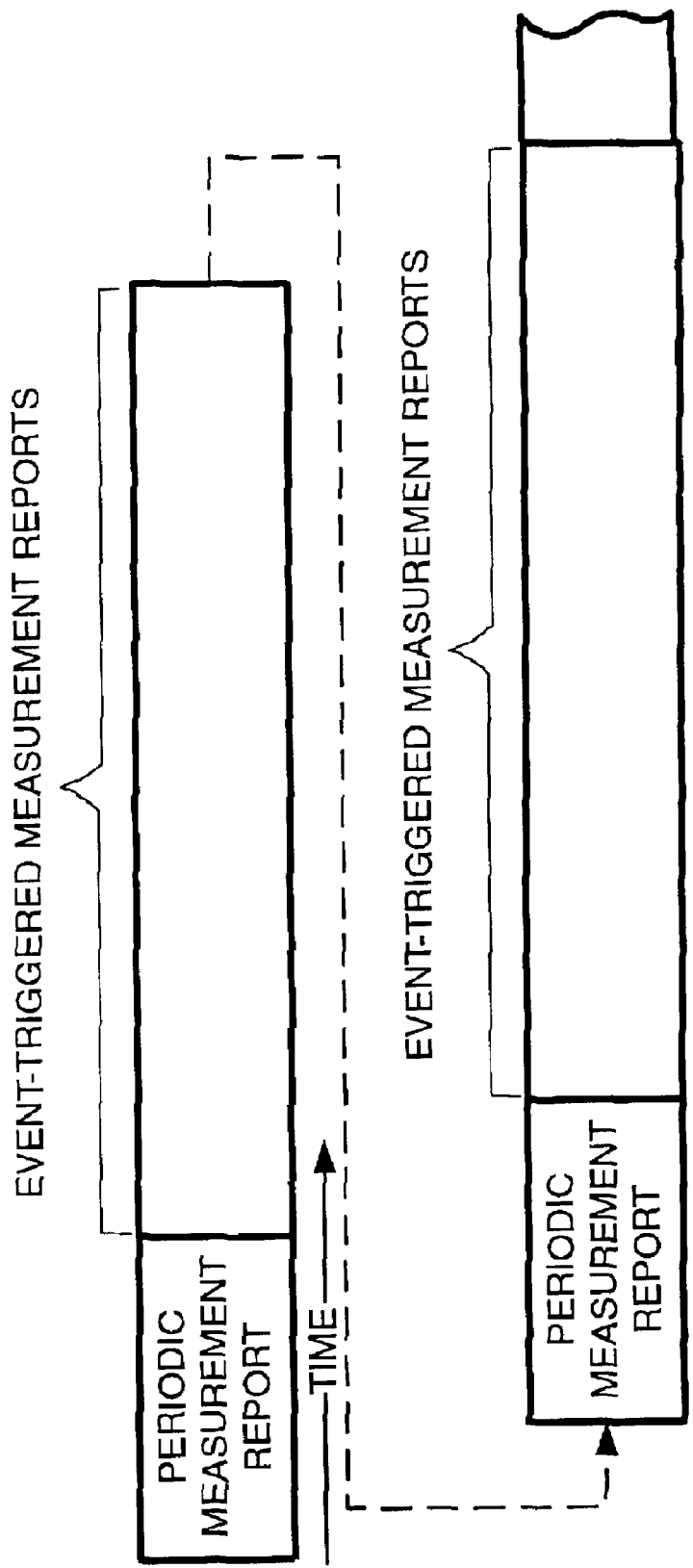
FIG. 10 is a diagrammatic view illustrating a reporting mode of the present invention involving usage of periodic measurement reports for a short period of time, and event triggered measurement reports the rest of the time.

Reference was made above, for example in connection with step 3-1, that measurement reports regarding the signal quality of the destination base station $BS_D$ was made by the mobile station (MS) were forwarded to the control node. Normally in W-CDMA, measurement reports are sent from the mobile station (MS) to the control node CN when some event is triggered, e.g., when the signal quality from the destination base station $BS_D$ gets above a certain threshold for handover. If event triggered measurement reports are used, an effort would have to be made to keep track of previous measured signal quality levels at the mobile station (MS), and to forward these records to the control node CN when the handover event is triggered. As an alternative, periodic measurement reports can also be sent from the mobile station (MS) to the control node CN. The periodic measurement reports involve more signaling. A variation is then to use only periodic measurements during a short period of time in order to collect the necessary statistics from a number of mobile stations (MSs), as illustrated in FIG. 10. After a while new statistics can be collected, using periodic measurements. In this way the probability function will adapt to the current traffic situation, but sill not utilize too much signaling. The fact that the method adapts to the current traffic situation is important, because the network operators do not have to configure the control nodes and base stations manually.

In an example deployment of the invention, the dynamic offset threshold determination unit is situated at a control node of the telecommunications system, such as a radio network control (RNC) node. The specified mobile station sends to the control node a measurement report of the signal strength of the destination base station as received at the specified mobile station, thereby enabling the dynamic offset threshold determination unit to makes its prediction.

Figure 11:
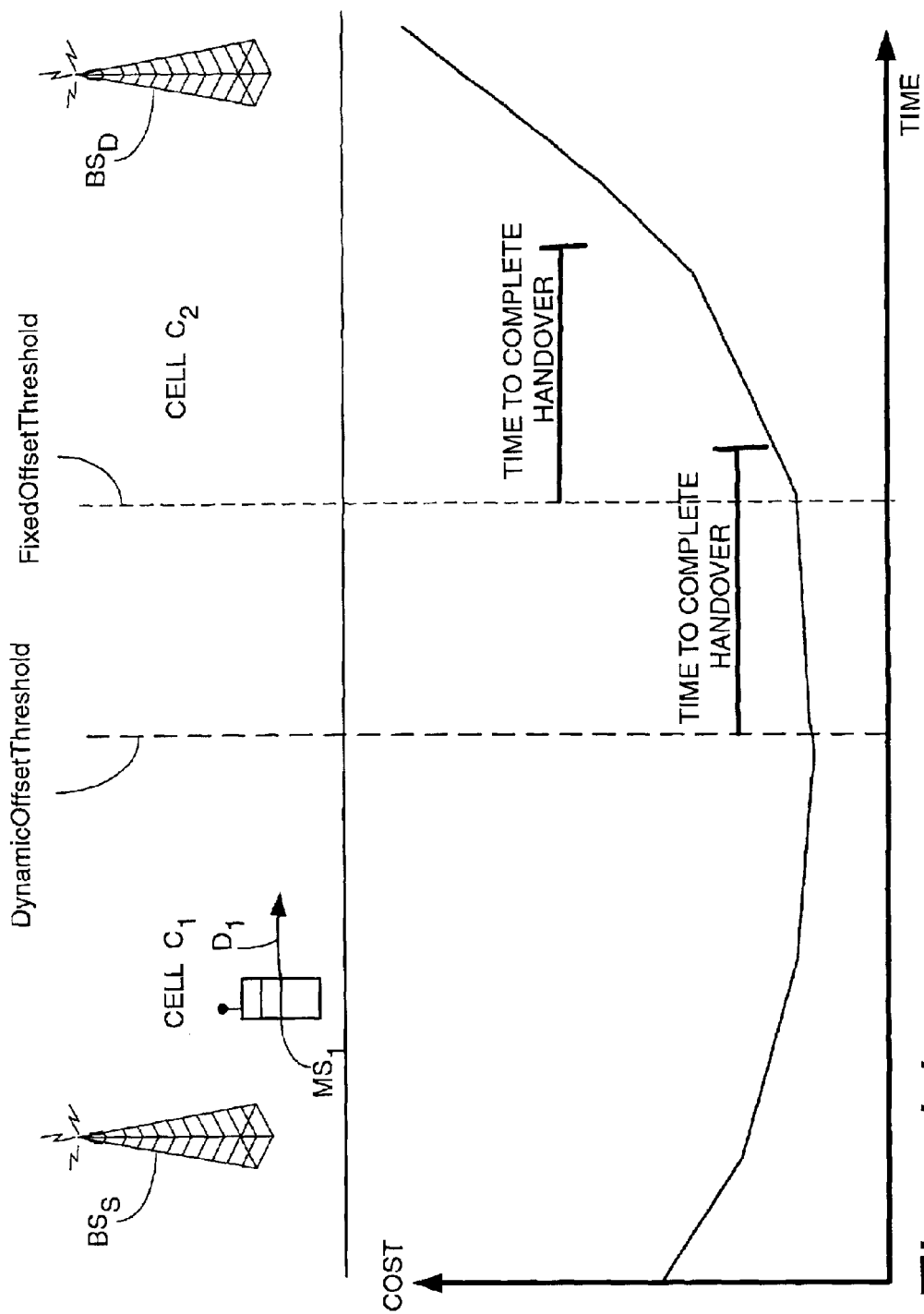
FIG. 11 is a graph showing cost of performing a soft handover at differing points in time.

The invention allows a soft handover procedure to be executed at a point in time when the cost of execution is as low as possible, thereby leading to increased capacity in the network and lower risks for dropped calls at soft handover. The cost of execution can be expressed as a combination of utilized radio resources, utilized hardware resources, and the rate of dropped calls. FIG. 11 graphically illustrates such cost of execution as a function of the handover procedure being performed at different points in time. If the mobile station (MS) suddenly changes direction or terminates the call, the resources already set up for the mobile station (MS) will be wasted. To minimize the waste of resources in such event, the handover procedure can be divided into smaller consecutive parts, each triggered by its own threshold value. The user will then have more and more resources set up progressively as the probability for handover gets is higher.

The present invention thus does not predict when a fixed-threshold handover for a mobile station will occur, but instead provides a dynamic offset threshold for starting soft handover. When the dynamic offset threshold for soft handover is exceeded, a preliminary portion of a handover sequence is initiated at the destination base station. The preliminary portion of the handover sequence is initiated so that a time-critical handover sequence activity (such as L1 uplink synchronization) is well underway, if not completed, by the time the soft handover is actually needed. The dynamic offset threshold for starting handover is based on a probability that the mobile station will engage in the handover. The probability is a statistical probability that handover will actually occur based on handover history of other mobile stations previously and similarly traveling and of the same signal strength.

FIG. 12, in conjunction with other figures such as FIG. 3, illustrates initiation and various aspects of the preliminary portion of the handover sequence and the remaining (another) portion of the handover sequence. In particular, FIG. 12 shows example basic actions which occur with respect to the mobile station (MS), the destination base station, and the control node, as well as certain signaling and other transmissions between these entities.

Action 12-1 of FIG. 12 is transmission of a measurement report from mobile station (MS) to the control node. The transmission of the measurement report occurs, of course, through a base station, such as the source base station or another base station in the active set. Upon receipt of the measurement report at the control node, the control node evaluates the measurements included in the measurement report, as indicated by action 12-2. The evaluation of action 12-2 includes several of the steps of FIG. 3. Among the included steps is step 3-1, involving acquisition of the signal strength measurement from the mobile station (MS) of the destination base station (the destination base station not being in the active set). In addition, action 12-2 includes step 3-3 through step 3-6 of FIG. 3, which involve a determination of handover probability (step 3-3) and computation of Expression 2 for the DynamicOffset (step 34) and computation of Expression 3 for the DynamicOffsetThreshold (step 3-5).

If is determined at step 3-6 (included in action 12-2) that the measured signal quality of the destination base station as received at the mobile station (MS) exceeds the DynamicOffsetThreshold, the preliminary handover routine of the control node is performed (step 3-7). The preliminary portion of the handover sequence is basically depicted as being within the upper dash-dotted line block of FIG. 12. Performance of the preliminary handover routine of the control node includes action 12-3 (uplink resource allocation) and action 12-4 (transmission of an uplink radio link setup request message from the control node to the destination base station), and (when the uplink radio link setup is successful) receipt of a UE detected message (action 12-8). Examples of the types of resources which are allocated include radio resources for traffic functions (e.g., codes, resources for handling of admission and congestion) and hardware resources (e.g., a receiver (RX)-card allocated for the user, [possibly] admission and congestion handling of shared resources [like processor usage, for example]).

Transmission of the uplink radio link setup request (action 12-4) from the control node to the destination base station primarily results in two basic actions occurring at the destination base station. These two basis actions comprise the preliminary portion of the handover sequence performed by the destination base station. A first such action is turning on a verification receiver at the destination base station to listen for the mobile station for which soft handover is anticipated (action 12-25). A second such action is performance of an uplink synchronization procedure between the mobile station and the destination base station (action 12-7). The uplink synchronization procedure involves receipt by the just-started receiver at the destination base station of a passive transmission from the mobile station (action 12-6). The uplink synchronization procedure includes measuring or determining the time position of the mobile station. Determination of the time position of the mobile station can be complex and time intensive, but in accordance with the present invention is performed at a non-critical occasion. Various aspects of uplink synchronization, and details of synchronization searchers for determining mobile station time position in general, can be gleaned from one or more of the following United States Patent Applications, both of which are incorporated herein by reference: U.S. patent application Ser. No. 09/452,105, entitled "Synchronization of Diversity Handover Destination Base Station"; and U.S. patent application Ser. No. 09/070,778, entitled "Search Window Delay Tracking In Code Division Multiple Access Communication System".

Assuming that the destination base station can achieve uplink synchronization relative to the mobile station, a MS detected message (e.g., UE detected message) is sent from the destination base station to the control node as action 12-8. At that point, the control node performs the flag and timer setting steps of step 3-8 and step 3-9 of FIG. 3.

Receipt of the uplink radio link setup request message of action 12-4 starts a timer in the destination base station. If the destination base station is unable (using the verification receiver started at action 12-5) to detect the mobile station before expiration of the timer the resources set up for the receiver and for mobile station are taken down. Such a timer can also be useful to take down the resources if the signal quality between the mobile station and the destination base station never exceeds the FixedOffsetThreshold of Expression 1(e.g., if the mobile station changes direction or terminates the call before entering the destination cell).

The mobile station (MS) is determined to have actually entered the handover area for the destination cell when the measured signal quality from the destination base station as received at the mobile station (MS) exceeds the FixedOffsetThreshold of Expression 1. FIG. 12 shows, as action 12-9, transmission of a measurement report from the mobile station to the control node. The transmission of the measurement report of action 12-9 is subsequent to and separate from the transmission of the measurement report of action 12-1. As action 12-10, the measurement report is evaluated to determine if the handover sequence can be completed. The evaluation of action 12-10 of FIG. 12 involves step 3-1, step 3-2, and step 3-11 of FIG. 3. In particular, in the ensuing discussion it is now assumed that the measured signal strength of the signal quality of the destination base station as received at the mobile station (MS) exceeds the FixedOffsetThreshold of Expression 1 (see step 3-11) at the time of the report of the measurement report of action 12-9.

When the signal quality of the destination base station as received at the mobile station (MS) exceeds the FixedOffsetThreshold of Expression 1, the remainder portion of the handover sequence is performed. Since the preliminary portion of the handover sequence (above described) has been performed, the time position of the mobile station (MS) is already known due to the uplink L1 synchronization procedure of the preliminary portion of the handover sequence. Therefore, now that the time has come for the actual handover to be performed for the mobile station, the destination base station need not spend valuable time in the time-consuming task of performing L1 uplink synchronization.

The remaining portion of the handover sequence is basically depicted as being within the lower dash-dotted line block of FIG. 12. As action 12-11, downlink resources are allocated at the control node. Examples of such downlink resources include radio resources for traffic functions (e.g., codes, resources for handling of admission and congestion); hardware resources (a transmitter (TX) card allocated for the user, [possibly] admission and congestion handling of shared resources [like processor usage]); DL transmission resources (transport channel for user data is reserved). A downlink radio link setup request message is sent from the control node to the destination base station as action 12-12. Receipt of the downlink radio link setup request message at the destination base station results in the destination base station performing a radio link setup operation. The RL setup includes allocation and configuration of the necessary resources for the radio link, like an RX card. Radio connection supervision algorithms are also started in the base station. After the radio link is successfully set up, the destination base station sends a radio link setup response message to the control node as action 12-14.

Knowing that the radio link between the destination base station and the mobile station (MS) has been successfully set up, the control node sends an active set update message to the mobile station (MS) as action 12-15. The active set update message of action 12-15 essentially instructs the mobile station (MS) to include the destination base station in the active set, so that a leg of the connection can be established through the destination base station. Assuming that the destination base station employs AAL2 for the transmission of user data, the destination base station (as action 12-16) internally establishes an AAL2 connection through the destination base station to handle the new leg of the connection. For a destination base station which uses another type of protocol for the user data, another suitable type of connection is established in the base station. Action 12-17 is a message from the destination base station which confirms that the destination base station has, in fact, established its internal (e.g., AAL2) connection.

Upon the receipt of the first instance of user data (transmitted as action 12-18), the destination base station turns on a transmitter for the mobile station (MS) as action 12-19. When the transmitter has been turned on, the destination base station and the mobile station (MS) engage in a power ramping operation (action 12-20) which determines the power level at which the base station should transmit. When the appropriate transmit level has been determined for the base station, as action 12-21 a downlink synchronization procedure is performed between the destination base station and the mobile station (MS). When the downlink synchronization procedure has been successfully completed, the mobile station (MS) sends an active set update complete message (as action 12-22) to the control node. The destination base station sends a radio link restore indication to the control node as action 12-23.

Thus, as evident from the foregoing and FIG. 12 in particular, the present invention involves initiating at the destination base station the preliminary portion of the handover sequence for the specified mobile station, and then subsequently initiating at the destination base station another portion of a handover sequence (e.g., the remaining portion of the handover sequence) for the specified mobile station. The preliminary portion of the handover sequence involves an operation between the destination base station and the specified mobile station that is more time critical than operations performed during the remaining portion of the handover sequence. In particular, in the illustrated example, the preliminary portion of the handover sequence includes L1 uplink radio synchronization with respect to the specified mobile station One non-limiting, example deployment of the present invention is described in the context of a universal mobile telecommunications (UMTS) 10 shown in FIG. 6. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to their corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

Figure 6:
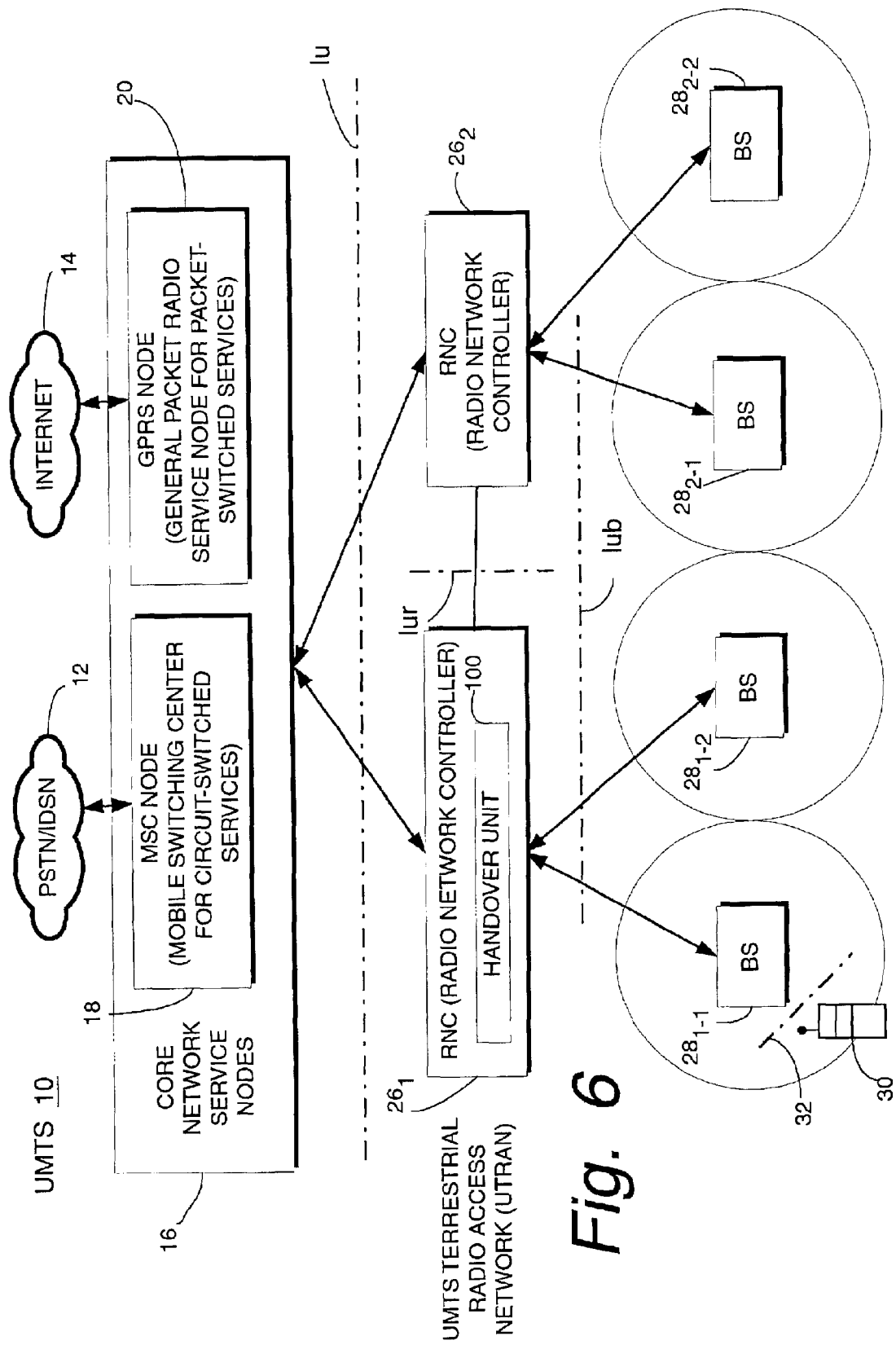
FIG. 6 is diagrammatic view of example mobile communications system in which the present invention may be advantageously employed.

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 6 is shown with only two RNC nodes, particularly RNC $26_1$ and RNC$26_2$. In FIG. 6, for sake of simplicity only one of the RNC nodes 26 is shown with a time position estimator 100 of the present invention. Each RNC 26 is connected to a plurality of base stations (BS) 28. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover, FIG. 6 shows that an RNC can be connected over an Iur interface to one or more other RNCs in the URAN 24.

A mobile station (MS), such as mobile station (MS) 30 shown in FIG. 6, communicates with one or more base stations (BS) 28 over a radio or air interface 32. Each of the radio interface 32, the Iu interface, the Iub interface, and the Iur interface are shown by dash-dotted lines in FIG. 6.

Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station (MS) or equipment unit (UE) 30 is assigned its own scrambling code in order for a base station 28 to identify transmissions from that particular mobile station (MS) as well as for the mobile station (MS) to identify transmissions from the base station intended for that mobile station (MS) from all of the other transmissions and noise present in the same area.

Figure 7:
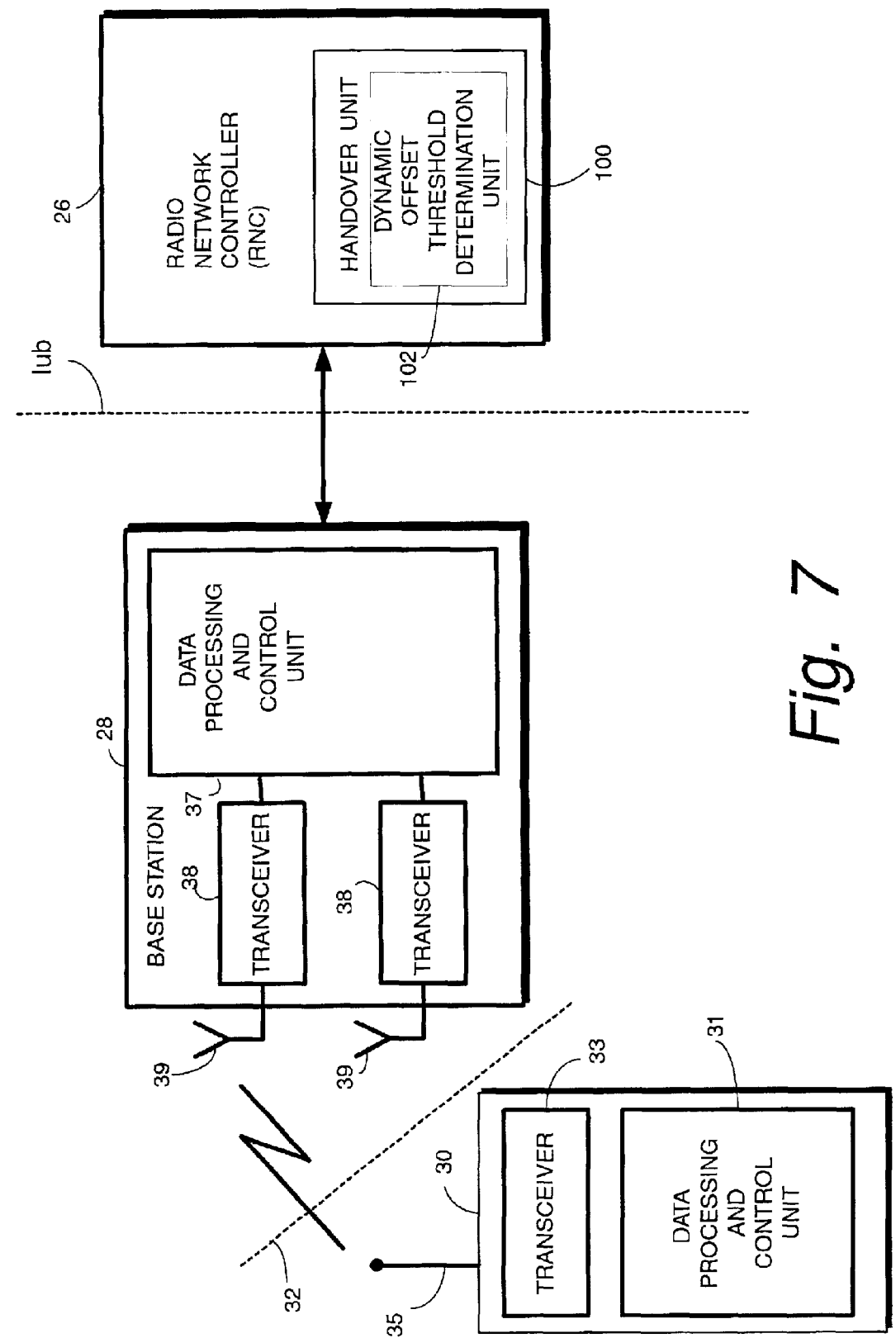
FIG. 7 is a simplified function block diagram of a portion of a UMTS Terrestrial Radio Access Network, including a mobile station (MS) station; a radio network controller; and a base station.

FIG. 7 shows selected general aspects of mobile station (MS) 30 and illustrative nodes such as radio network controller 26 and base station 28. The mobile station (MS) 30 shown in FIG. 7 includes a data processing and control unit 31 for controlling various operations required by the mobile station (MS). The data processing and control unit 31 of the mobile station (MS) provides control signals as well as data to a radio transceiver 33 connected to an antenna 35.

The example radio network controller 26 and base station 28 as shown in FIG. 7 are radio network nodes that each include a corresponding data processing and control unit 36 and 37, respectively, for performing numerous radio and data processing operations required to conduct communications between the RNC 26 and the user equipment units (UEs) 30. The data processing and control unit 36 of the RNC includes the diversity handover unit 100 of the present invention with its dynamic offset threshold determination unit 102. Part of the equipment controlled by the base station data processing and control unit 37 includes plural radio transceivers 38 connected to one or more antennas 39.

Figure 8:
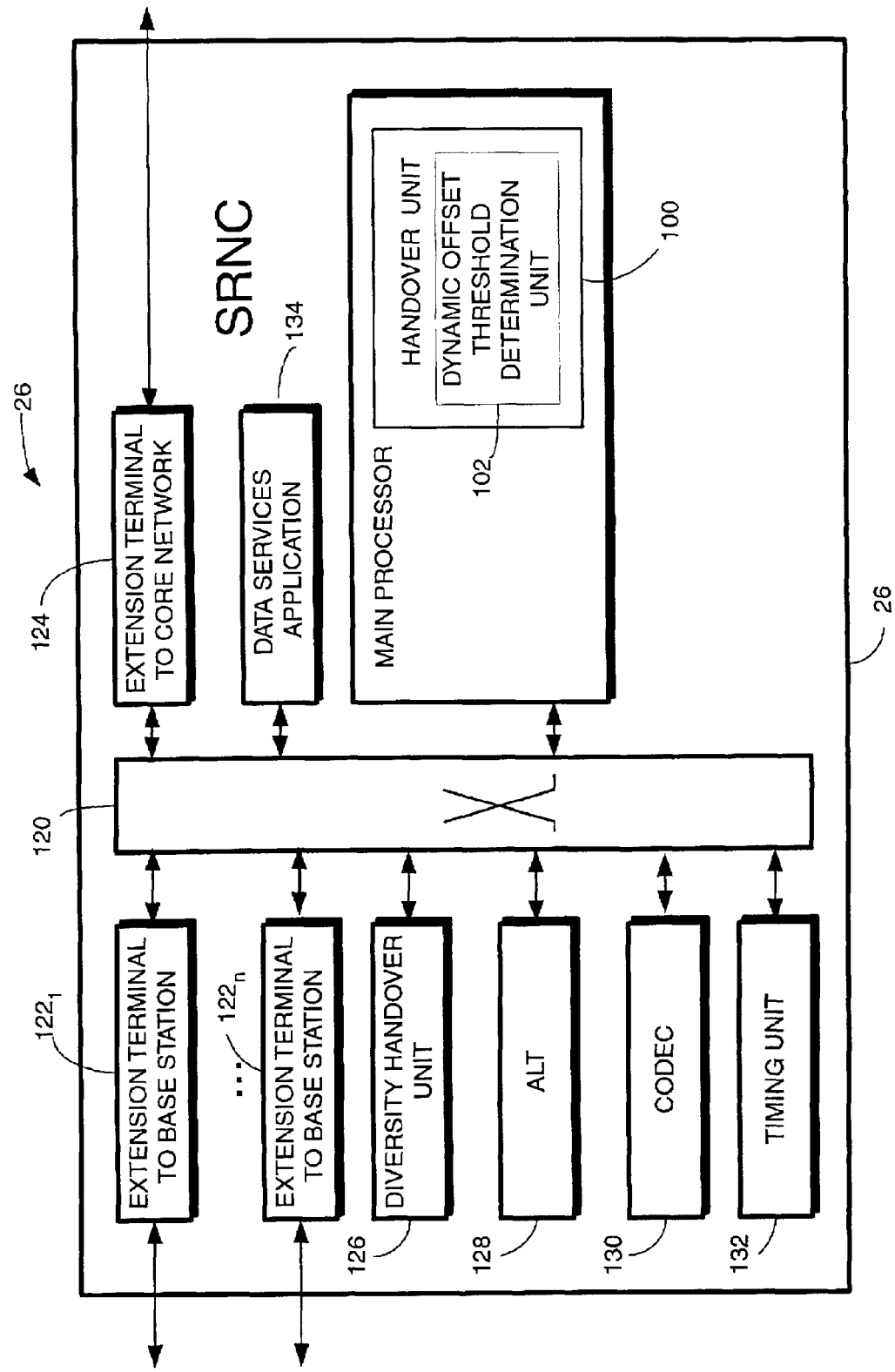
FIG. 8 is a schematic view of an example RNC node in accordance with one embodiment of the invention.

FIG. 8 illustrates, in somewhat more detail, an example non-limiting RNC node 26 of the present invention. It so happens that the RNC node 26 of FIG. 8 is a switched-based node having a switch 120. The switch 120 serves to interconnect other constituent elements of RNC node 26. Such other constituent elements include extension terminals 122$_1$ through 122$_n$, as well as extension terminal 124. Extension terminals 122$_1$ through 122$_n$ essentially function to connect RNC node 26 to the base stations 28 served by RNC node 26; extension terminal 124 connects RNC node 26 across the Iu interface to the core network.

Yet other constituent elements of RNC node 26 include diversity handover unit 126; an ALT unit 128; codex 130; timing unit 132; a data services application unit 134; and, a main processor 140. The person skilled in the art will appreciate generally the functions of these constituent elements, it being noted that the ALT unit 128 is a unit which provides, e.g., multiplexing and demultiplexing and (optionally) queuing with regard to differing protocols of cells. In one example implementation of the present invention, the diversity handover unit 100 with its dynamic offset threshold determination unit 102 is situated in the diversity handover unit 126. One ore more functions of dynamic offset threshold determination unit 102 can be delegated to main processor 140.

Figure 9:
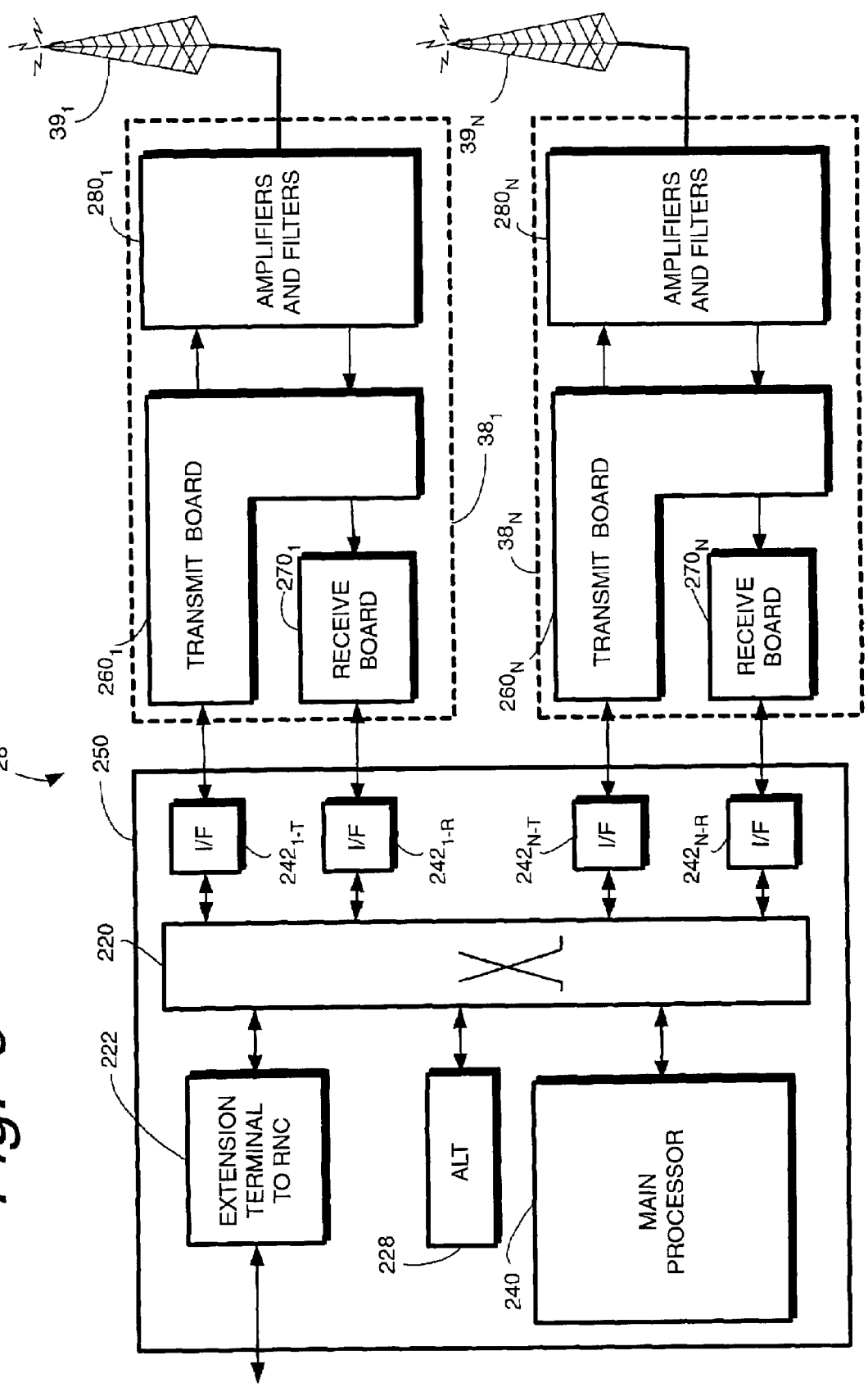
FIG. 9 is a schematic view of an example base station node in accordance with one embodiment of the invention.

FIG. 9 illustrates, in non-limiting manner, more details of an example base station (BS) node 28 in accordance with one embodiment of the present invention. As with RNC node 26, the base station (BS) node 28 of FIG. 9 is a switched-based node having a switch 220 which serves to interconnect other constituent elements of base station (BS) node 28. Such other constituent elements include extension terminal 222; ALT unit 228; BS main processor 240, and interface boards 242.

Extension terminal 222 connects base station (BS) node 28 to radio network controller (RNC) node 26, and thus comprises the Iub interface. As in the case of radio network controller (RNC) node 26, the ALT unit 228 is a unit which provides, e.g., multiplexing and demultiplexing and (optionally) queuing with regard to differing protocols of cells.

During the preliminary portion the base station only receives data, and no transmission has to be made. The data is sent from receiver board to the main processor, for processing. When the UL synch is done, a message is sent to the RNC. Thus, antenna 39, amplifier and filters 280, receive board 270, interface 240, and extension terminal 222 are involved. The difference for the remainder of the handover sequence is that also transmissions are made to the MS, which means that transmit board 260 is also involved.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. For use in a telecommunications system having a source base station and a destination base station where a specified mobile station establishes a connection with the source base station, a method comprising:

determining a dynamic offset threshold for starting at least a portion of a soft handover sequence for the specified mobile station at the destination base station, the dynamic offset threshold being a function of a probability that the specified mobile station will engage in soft handover;

initiating the at least a portion of the soft handover sequence when a signal strength from the destination base station as received at the specified mobile station has a predetermined relationship to the dynamic offset threshold.

2. The method of claim 1, further comprising initiating another portion of the soft handover sequence when the signal strength from the destination base station as received at the specified mobile station has a predetermined relationship to a fixed offset threshold.

3. The method of claim 2, wherein the another portion of the soft handover sequence is a remainder of the soft handover sequence.

4. The method of claim 1, wherein the probability is a function of signal strength of the destination base station as received at the specified mobile station.

5. The method of claim 1, wherein the probability is a function of signal strength of the destination base station as received at the specified mobile station and a function of signal strength of the source base station as received at the specified mobile station.

6. The method of claim 1, wherein the probability is a statistical probability based on handover history of other mobile stations.

7. The method of claim 1, further comprising initiating the at least a portion of the soft handover sequence when a signal strength from the destination base station as received at the specified mobile station is not less than the dynamic offset threshold, the dynamic offset threshold being a difference between the signal strength of the source base station as received at the specified mobile station and a dynamic offset.

8. The method of claim 7, wherein the dynamic offset is a function of a fixed offset and the probability of the specified mobile station fulfilling the handover criteria.

9. The method of claim 1, further comprising determining the dynamic offset threshold at a control node of the code division multiple access communication system.

10. The method of claim 9, further comprising the specified mobile station sending to the control node a measurement report of the signal strength of the destination base station as received at the specified mobile station.

11. A telecommunications system comprising:

a source base station;

a destination base station;

a dynamic offset threshold determination unit which determines a dynamic offset threshold for starting at least a portion of a soft handover sequence for the specified mobile station at the destination base station, the dynamic offset threshold being a function of a probability that the specified mobile station will engage in soft handover;

wherein the dynamic offset threshold determination unit initiates the at least a portion of the soft handover sequence when a signal strength from the destination base station as received at the specified mobile station has a predetermined relationship to the dynamic offset threshold.

12. The apparatus of claim 11, wherein the probability is a function of signal strength of the destination base station as received at the specified mobile station.

13. The apparatus of claim 11, wherein the probability is a function of signal strength of the destination base station as received at the specified mobile station and a function of signal strength of the source base station as received at the specified mobile station.

14. The apparatus of claim 11, wherein the probability is a statistical probability based on handover history of other mobile stations.

15. The apparatus of claim 11, wherein the dynamic offset threshold determination unit is situated at a control node of the code division multiple access communication system.

16. The apparatus of claim 15, wherein control node receives from the specified mobile station a measurement report of the signal strength of the destination base station as received at the specified mobile station.

17. A telecommunications system comprising:
a source base station;
a destination base station;
a dynamic offset threshold determination unit which determines a dynamic offset threshold for starting at least a portion of a soft handover sequence for the specified mobile station at the destination base station, the dynamic offset threshold being a function of a probability that the specified mobile station will engage in soft handover;
a handover unit which initiates another portion of the soft handover sequence when the signal strength from the destination base station as received at the specified mobile station has a predetermined relationship to a fixed offset threshold.

18. The apparatus of claim 17, wherein the another portion of the soft handover sequence is a remainder of the soft handover sequence.

19. The apparatus of claim 17, wherein the probability is a function of signal strength of the destination base station as received at the specified mobile station.

20. The apparatus of claim 17, wherein the probability is a function of signal strength of the destination base station as received at the specified mobile station and a function of signal strength of the source base station as received at the specified mobile station.

21. The apparatus of claim 17, wherein the probability is a statistical probability based on handover history of other mobile stations.

22. The apparatus of claim 17, wherein the dynamic offset threshold determination unit is situated at a control node of the code division multiple access communication system.

23. The apparatus of claim 22, wherein control node receives from the specified mobile station a measurement report of the signal strength of the destination base station as received at the specified mobile station.

24. A telecommunications system comprising:
a source base station;
a destination base station;
a dynamic offset threshold determination unit which determines a dynamic offset threshold for starting at least a portion of a soft handover sequence for the specified mobile station at the destination base station, the dynamic offset threshold being a function of a probability that the specified mobile station will engage in soft handover;
wherein the dynamic offset threshold determination unit initiates the at least a portion of the soft handover sequence when a signal strength from the destination base station as received at the specified mobile station is not less than the dynamic offset threshold, the dynamic offset threshold being a difference between the signal strength of the source base station as received at the specified mobile station and a dynamic offset.

25. The apparatus of claim 24, wherein the dynamic offset is a function of a fixed offset and the probability of the specified mobile station fulfilling the handover criteria.

26. The apparatus of claim 24, wherein the probability is a function of signal strength of the destination base station as received at the specified mobile station.

27. The apparatus of claim 24, wherein the probability is a function of signal strength of the destination base station as received at the specified mobile station and a function of signal strength of the source base station as received at the specified mobile station.

28. The apparatus of claim 24, wherein the probability is a statistical probability based on handover history of other mobile stations.

29. The apparatus of claim 24, wherein the dynamic offset threshold determination unit is situated at a control node of the code division multiple access communication system.

30. The apparatus of claim 29, wherein control node receives from the specified mobile station a measurement report of the signal strength of the destination base station as received at the specified mobile station.

* * * * *